US009582002B2

(12) United States Patent
Cavender-Bares

(10) Patent No.: US 9,582,002 B2
(45) Date of Patent: Feb. 28, 2017

(54) ROBOTIC PLATFORM AND METHOD FOR PERFORMING MULTIPLE FUNCTIONS IN AGRICULTURAL SYSTEMS

(71) Applicant: RowBot Systems LLC, Minneapolis, MN (US)

(72) Inventor: Kent Cavender-Bares, St. Paul, MN (US)

(73) Assignee: ROWBOT SYSTEMS LLC, Minneapolis, MN (US)

( * ) Notice: Subject to any disclaimer, the term of this patent is extended or adjusted under 35 U.S.C. 154(b) by 0 days.

(21) Appl. No.: 14/994,485

(22) Filed: Jan. 13, 2016

(65) Prior Publication Data

US 2016/0124433 A1 May 5, 2016

Related U.S. Application Data

(63) Continuation of application No. 14/548,421, filed on Nov. 20, 2014, now Pat. No. 9,265,187.

(Continued)

(51) Int. Cl.

| | |
|---|---|
| G05D 1/00 | (2006.01) |
| A01C 7/00 | (2006.01) |
| A01B 69/04 | (2006.01) |
| A01B 79/00 | (2006.01) |
| A01C 21/00 | (2006.01) |
| A01C 7/08 | (2006.01) |
| A01C 15/00 | (2006.01) |
| A01C 23/02 | (2006.01) |
| B25J 5/00 | (2006.01) |

(Continued)

(52) U.S. Cl.
CPC ......... *G05D 1/0088* (2013.01); *A01B 69/008* (2013.01); *A01B 79/005* (2013.01); *A01C 7/00* (2013.01); *A01C 7/085* (2013.01); *A01C 15/00* (2013.01); *A01C 21/002* (2013.01); *A01C 23/024* (2013.01); *B25J 5/00* (2013.01); *B64C 39/024* (2013.01); *G05D 1/0011* (2013.01); *G05D 1/0231* (2013.01); *B64C 2201/12* (2013.01); *B64C 2201/141* (2013.01); *Y10S 901/01* (2013.01)

(58) Field of Classification Search
CPC .............................. G01S 3/7803; G06F 19/00
See application file for complete search history.

(56) References Cited

U.S. PATENT DOCUMENTS

| | | | | |
|---|---|---|---|---|
| 4,628,633 A | * | 12/1986 | Nilsson ................... | A01C 1/06 249/122 |
| 5,884,224 A | * | 3/1999 | McNabb ................. | A01G 7/00 700/284 |

(Continued)

*Primary Examiner* — Thomas Tarcza
*Assistant Examiner* — Alex C Dunn
(74) *Attorney, Agent, or Firm* — Patterson Thuente Pedersen, P.A.

(57) ABSTRACT

An autonomous vehicle platform and system for selectively performing an in-season management task in an agricultural field while self-navigating between rows of planted crops, the autonomous vehicle platform having a vehicle base with a width so dimensioned as to be insertable through the space between two rows of planted crops, the vehicle base having an in-season task management structure configured to perform various tasks, including selectively applying fertilizer, mapping growth zones and seeding cover crop within an agricultural field.

30 Claims, 27 Drawing Sheets

Related U.S. Application Data

(60) Provisional application No. 61/906,643, filed on Nov. 20, 2013.

(51) Int. Cl.
*B64C 39/02* (2006.01)
*G05D 1/02* (2006.01)

(56) References Cited

U.S. PATENT DOCUMENTS

| | | | | |
|---|---|---|---|---|
| 6,199,000 B1* | 3/2001 | Keller | ............... | A01B 79/005 |
| | | | | 342/357.52 |
| 6,516,271 B2* | 2/2003 | Upadhyaya | ........... | A01B 79/005 |
| | | | | 56/10.2 A |
| 6,553,299 B1* | 4/2003 | Keller | ............... | A01B 79/005 |
| | | | | 111/200 |
| 6,553,312 B2* | 4/2003 | Upadhyaya | ........... | A01C 21/005 |
| | | | | 342/357.31 |
| 8,683,742 B1* | 4/2014 | Cox | ............... | A01C 1/04 |
| | | | | 47/57.6 |
| 8,744,626 B2* | 6/2014 | Johnson | ............... | A01D 34/008 |
| | | | | 700/250 |
| 8,849,523 B1* | 9/2014 | Chan | ............... | G01S 13/89 |
| | | | | 111/149 |
| 9,389,298 B2* | 7/2016 | Smitherman | ........... | G01C 11/02 |
| 2014/0379228 A1* | 12/2014 | Batcheller | ............ | A01C 21/005 |
| | | | | 701/50 |

* cited by examiner

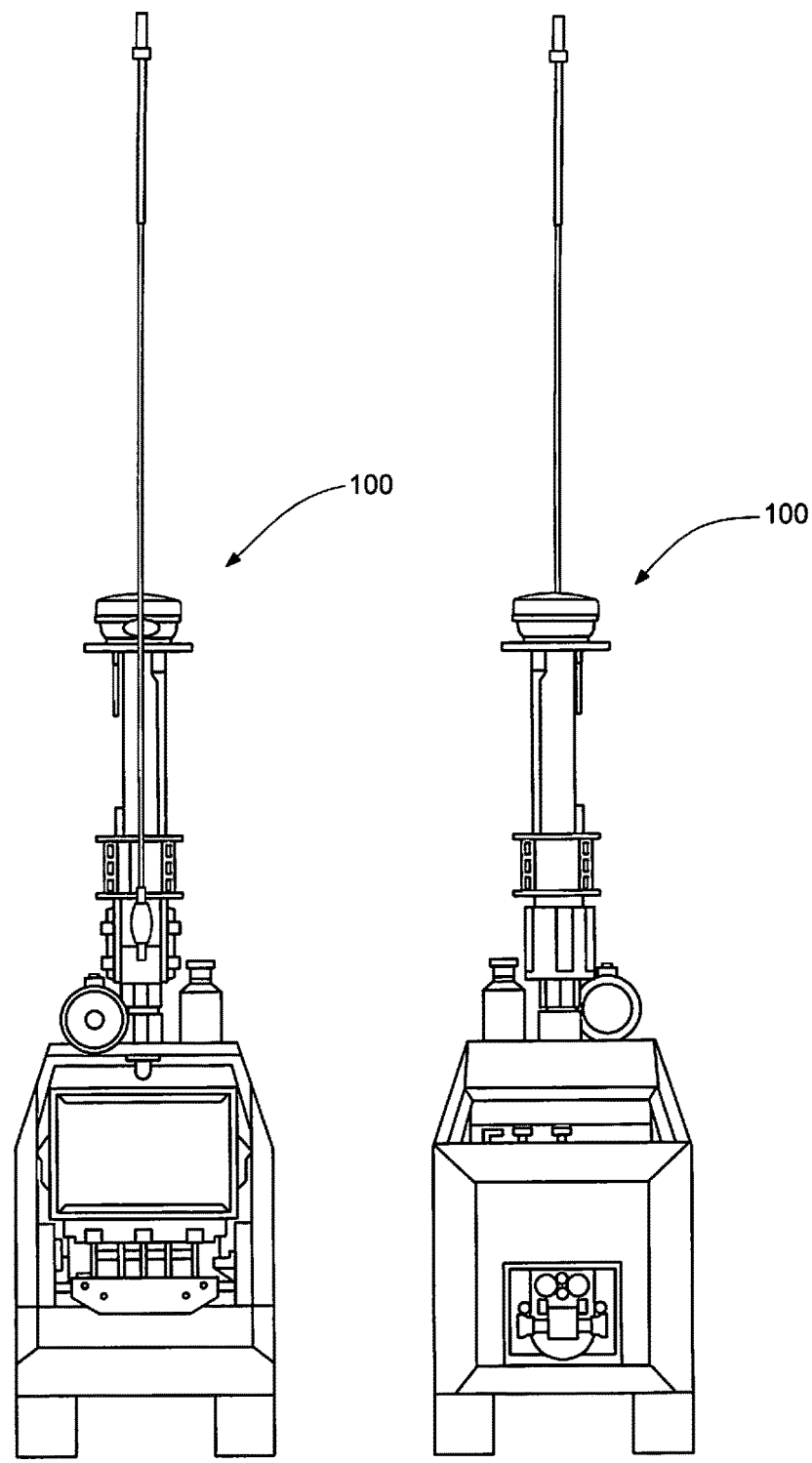
*Fig. 4*  *Fig. 5*

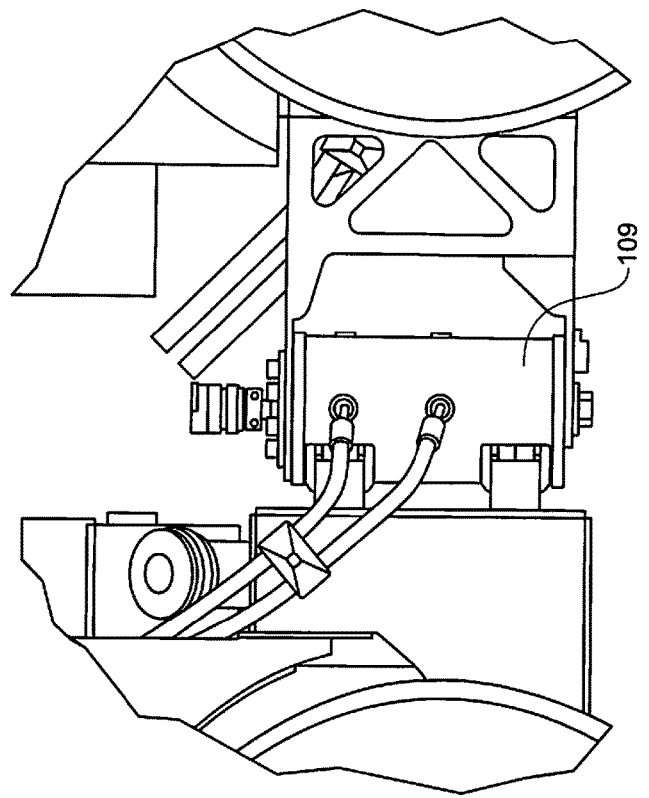
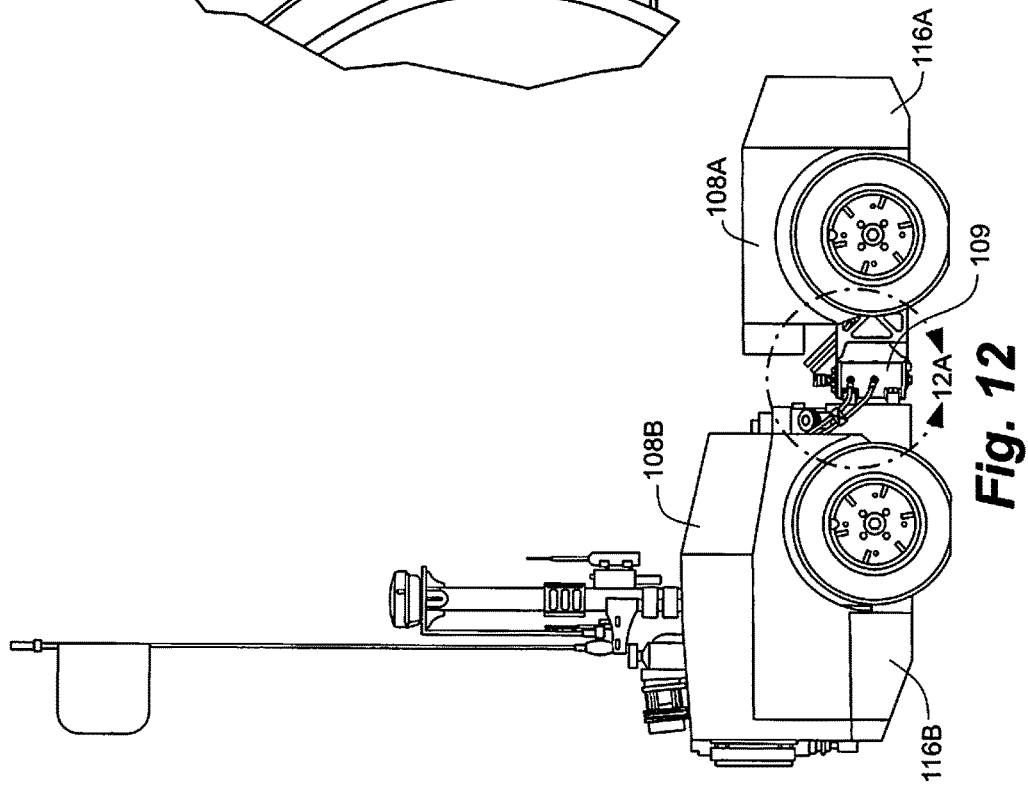

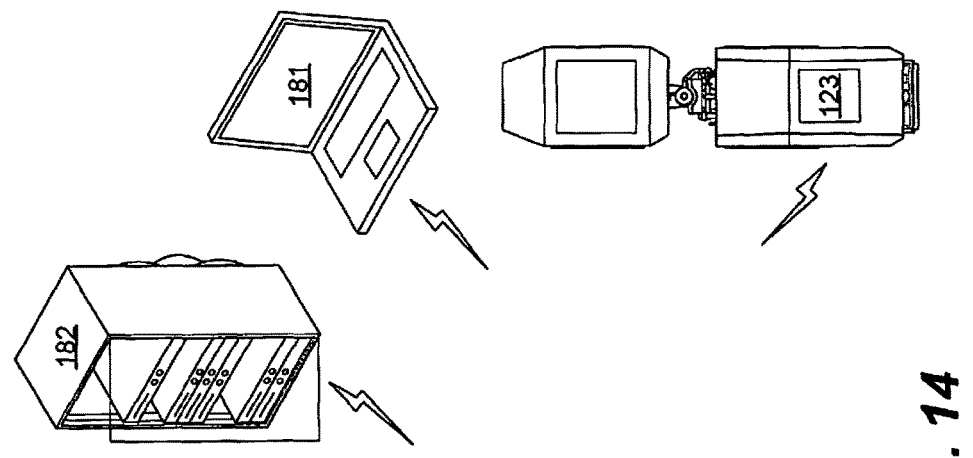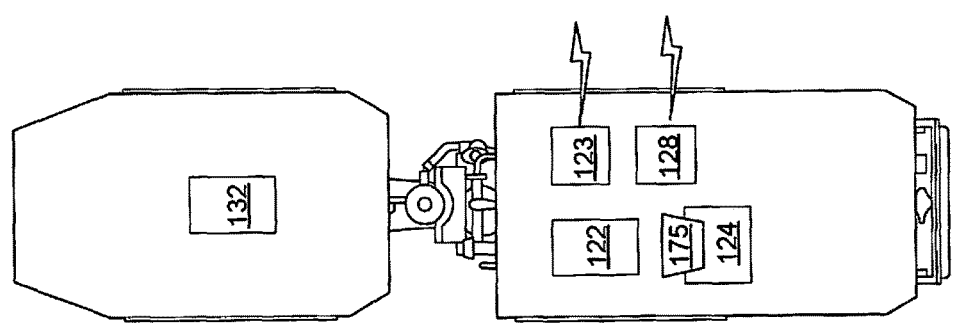
Fig. 14

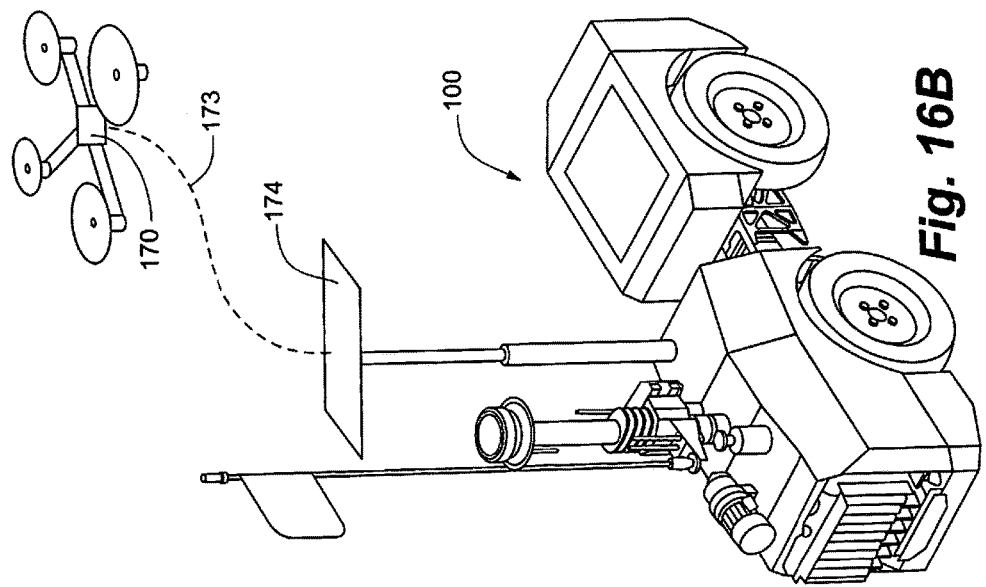
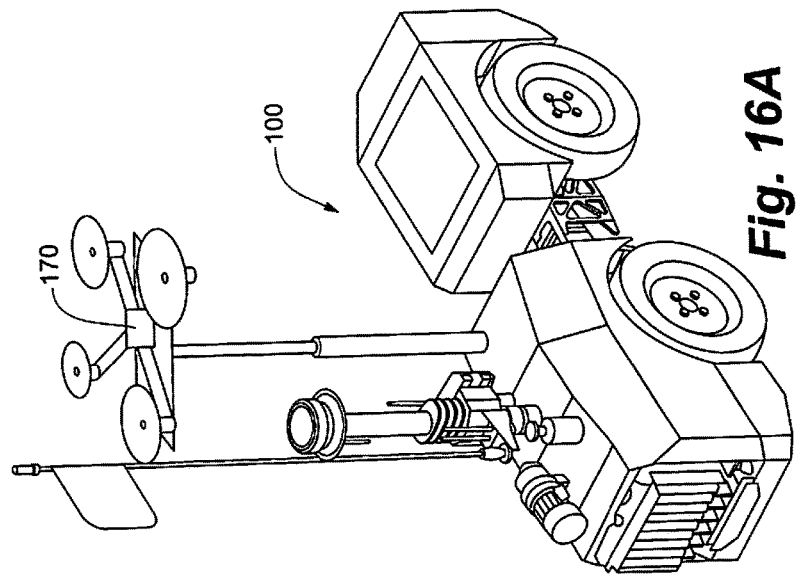

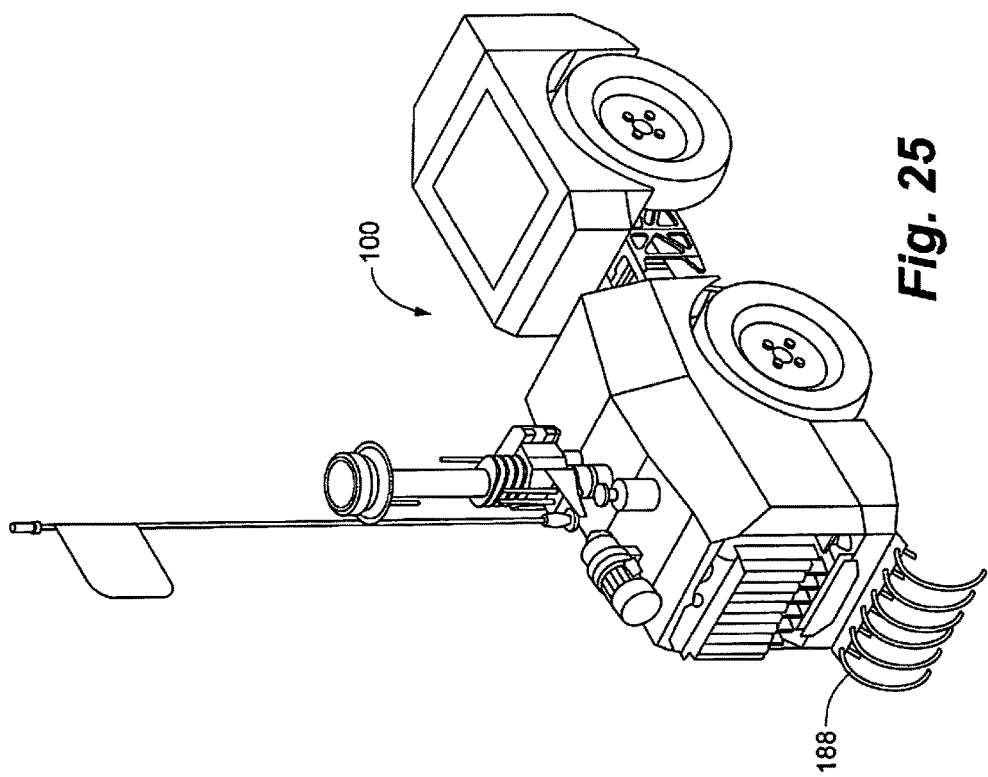

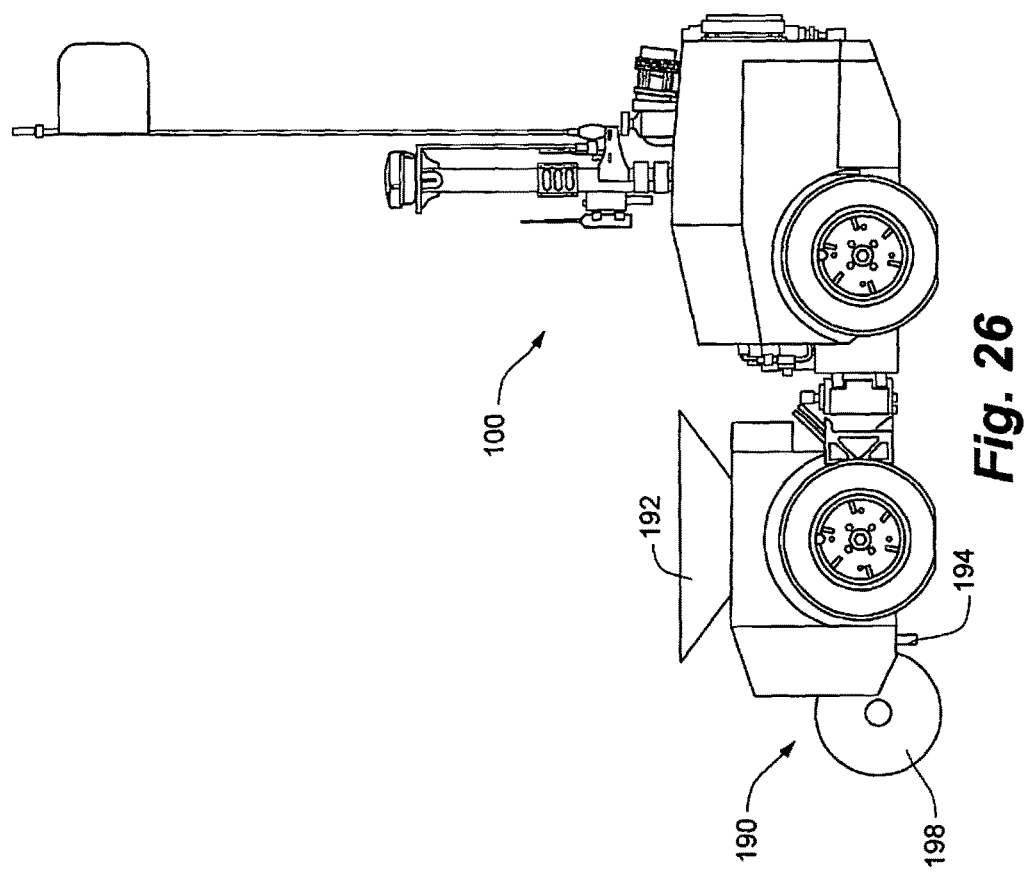

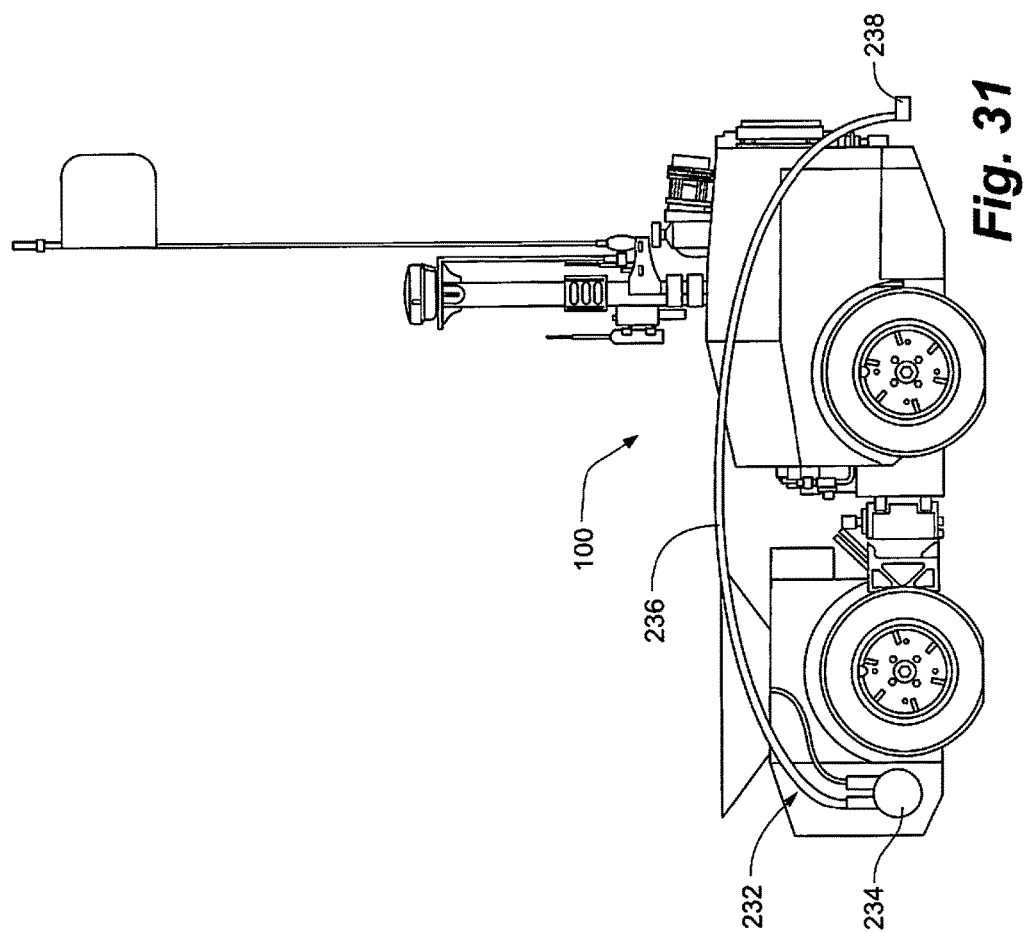

ROBOTIC PLATFORM AND METHOD FOR PERFORMING MULTIPLE FUNCTIONS IN AGRICULTURAL SYSTEMS

RELATED APPLICATIONS

This application is a continuation of application Ser. No. 14/548,421 filed Nov. 20, 2014, which claims the benefit of U.S. Provisional Application No. 61/906,643 filed Nov. 20, 2013, each of which is hereby fully incorporated herein by reference.

TECHNICAL FIELD

The present invention relates generally robotic platforms for use in agriculture. More particularly, the present invention relates to an autonomous vehicle platform configured to perform various in-season management tasks between the planted rows of an agricultural field.

BACKGROUND OF THE INVENTION

After a growing plant exhausts the nutrient resources stored in its seed, it begins to draw in nutrients from the surrounding soil using its root system. Rapidly growing plants have a high need for nutrients. If a plant cannot access the necessary nutrients then its growth becomes limited. Such nutrient limitation can impact the overall growth of the plant, and the economic return to the farmer. Farmers use a range of strategies for increasing the availability of nutrients for a growing crop, most notably the addition of chemical fertilizers, for example nitrogen and phosphorus. However, such chemical fertilizers can be lost from the field before providing any beneficial effect.

For example, nitrogen, which is commonly introduced to a field in the form of anhydrous ammonia or urea, can be lost through gas emission to the atmosphere or through run off as water drains from the field. In particular, ammonium, which is a positively charged ion, generally binds to soil particles and is resistant to loss via runoff. However, in alkaline conditions, ammonium transforms into its gaseous form, ammonia, which can be readily lost to the atmosphere. Ammonium can also be transformed into nitrate—and subsequently lost from the field—via a microbial process known as nitrification. Nitrate, on the other hand is a negatively charged ion and dissolves readily in water and can be lost as water runs off fields into drainage ditches or streams, or as water seeps downward into groundwater.

Nitrogen fertilizer containing urea is also susceptible to loss when applied to the soil surface. Specifically, when the urea is hydrolyzed, or broken down, it releases ammonia gas, which can be readily lost to the atmosphere. However, if the urea is hydrolyzed beneath the surface within the soil profile, there is a reduced chance that the ammonia gas will be lost.

Nitrogen from the various forms of fertilizer can also be lost through a process known as denitrification, whereby nitrate is converted to gaseous forms of nitrogen, including dinitrogen and nitrous oxide. And, nitrogen can also be lost through microbial-mediated processes that create other gaseous forms of nitrogen. Warmer soil temperatures cause microbial processes to occur more rapidly, meaning that nitrogen fertilizer remaining in or on warmer soils is increasingly susceptible to this type of loss.

Phosphorus, most commonly introduced to a field in the form of phosphate, generally has a lower loss rate than nitrogen, as phosphates readily bind to soil particles. Nevertheless, phosphorus can be lost from fields through soil erosion or, less commonly, via runoff if the soil can no longer bind additional phosphate because all of the available binding sites are filled.

Fertilizer costs, which are closely tied with the cost of fossil fuels, are significant in the production of commodity crops. Fertilizer that is lost from a field represents inefficiency in agricultural production systems, as well as a potential loss in profit realized by the farmer. The substantial cost of fertilizer in the production of commodity crops incentivizes farmers to adjust the application of fertilizer to closely match the needs of what they anticipate their crop will ultimately require throughout the growing season. Yet, because fertilizer is critical in boosting production, farmers are prone to over application out of anxiety that there will be insufficient nutrients available when they are required.

Particularly in the case of nitrogen fertilizer, the longer an externally-applied fertilizer remains on an agricultural field, the more opportunities there are for the fertilizer to be lost. Thus, ideally fertilizer is applied as needed throughout the growing season. However, tractor-drawn equipment generally cannot be used throughout the entire season. For example, corn plants, require nitrogen at least until reaching the point when tassels appear, which may be at a height of six feet or more. Conventional tractor-drawn implements are incapable of applying fertilizer when corn is so tall. This has led to the use of self-propelled sprayer systems, often referred to as "high boy" or "high-clearance" systems, capable of straddling tall crops. Airplanes commonly referred to as "crop dusters," have been used to apply fertilizer throughout the growth season. But, unlike conventional tractor-drawn implements, high boy systems and crop dusters typically indiscriminately apply the fertilizer to the surface of the field.

Additionally, many farmers forego in season application, in favor of spring or fall applications, because of their anxiety about being able to get the equipment necessary to apply the fertilizer on the field within the appropriate time window for weather reasons. Farmers also contend with a range of tradeoffs when considering the timing of fertilizer applications, for example, the cost of fertilizer is often reduced in the fall as the demand for fertilizer diminishes. As a result, preseason applications of fertilizer—either in the late fall following harvest or around the time of planting in the spring—are common. Nevertheless, both fall and spring applied fertilizer has the potential of being lost from the field due to the various processes outlined above.

Inefficient use of fertilizer often also occurs when fertilizer is uniformly applied across an entire field. Many agricultural fields are heterogeneous, with one location potentially varying year-to-year in its nutrient status and differing from locations in other parts of the field. As a result, many farmers assess soil nutrient status with periodic samples analyzed in a laboratory. These soil tests are used to estimate nutrient needs prior to the growing season, in-season, or prior to an in-season application of fertilizer. Because of the effort required to take these samples, they are generally infrequent and representative of a rather large area on a given field. Thus, in addition to applying fertilizer in-season when nutrients are needed, an ideal application would also take into account the specific soil conditions locally within the field.

Besides optimizing the application of fertilizer by applying it in-season as nutrients are required, and tailoring the amount to suit the localized nutrient deficiencies of the soil within a field, the planting of cover crops can help reduce nutrient loss. Cover crops are generally grown on a field between the times when a commodity crop is grown. As cover crops grow, they take up and store nutrients, essentially preventing them from being lost from the field in runoff or in other ways. Some cover crops can absorb nitrogen from the atmosphere, and can augment the amount of soil nitrogen in a field, thereby reducing the need for future applications of fertilizer. Additionally, the roots of cover crops can reduce soil compaction and reduce soil erosion. Because some time is needed for germination, the ideal time to seed a cover crop on a corn field is after maturity when the corn plants are tall and their leaves are beginning to senesce or turn brown. Seeding at this time allows sufficient light for cover crop growth to penetrate the leaf canopy, enabling substantial growth of the cover crop to occur before the onset of winter.

More recently, there has been an interest in the use of small robotic vehicles on farms. The notion of a tractor that could navigate autonomously first appeared in patent literature in the 1980s. For example, U.S. Pat. No. 4,482,960, entitled "Robotic Tractors," discloses a microcomputer based method and apparatus for automatically guiding tractors and other full sized farm machinery for the purpose of planting, tending and harvesting crops. One study in 2006 concluded that the relatively high cost of navigation systems and the relatively small payloads possible with small autonomous vehicles would make it extremely difficult to be cost effective as compared to more conventional agricultural methods. Accordingly, many of the autonomous vehicles that have been developed are as large as conventional tractors.

Despite the difficulty in maintaining cost effectiveness, a limited number of smaller agricultural robots have been developed. For example, the Maruyama Mfg. Co has developed a small autonomous vehicle capable of navigating between rows of crops. This vehicle, however, is limited to operating within a greenhouse, and is not suited for the uneven terrain typical of an agricultural field. Another example is U.S. Pat. No. 4,612,996, entitled "Robotic Agricultural System with Tractor Supported on Tracks," which discloses a robotic tractor that travels on rails forming a grid over a crop field. However, use of this system requires the installation of an elaborate and potentially expensive track system within the agricultural field. Moreover, neither system is designed to remove physical samples from the crops, plant a second crop or a "cover crop" while the first crop is growing, or use a system of sensors to alert an operator when the robot experiences a problem that it cannot solve on its own.

Accordingly, what is needed in the industry is a device which can autonomously navigate between the planted rows on the uneven terrain of an agricultural field to accomplish in-season management tasks, such as selectively taking physical samples of crops, and seeding cover crops when commodity crops grow to a height where use of convention tractor-drawn equipment or high clearance machines is no longer feasible or desired by the farmer because of potential risk of crop damage. Moreover, what is needed by the industry is a device which can alert an operator or team of operators if it encounters a problem, such as an obstacle, and cannot resolve the problem without intervention.

SUMMARY OF THE INVENTION

Embodiments of the present disclosure meet the need of the industry for a device which can autonomously navigate between planted rows on the uneven terrain of an agricultural field while simultaneously accomplish in-season management tasks, such as selectively taking physical samples of crops, and seeding cover crops, as well as alerting an operator if it encounters a problem, such as an obstacle, that it cannot resolve without intervention.

One embodiment of the present disclosure provides an autonomous vehicle platform for selectively performing an in-season management task in an agricultural field while self-navigating between rows of planted crops. The autonomous vehicle platform includes a vehicle base. The vehicle base has a length, width and height, wherein the width is so dimensioned as to be insertable through the space between two rows of planted crops. The base is coupled to at least a plurality of ground engaging wheels. At least one power train is fixedly coupled to the vehicle base and operably coupled to at least one of the ground engaging wheels. The vehicle further includes a seeding structure, a navigation module, and a microprocessor. The seeding structure includes a ground engaging implement and mixer. The ground engaging implement is configured to collect soil from the surface of the agricultural field. The mixer is configured to mix seeds with the collected soil to create seed balls. The seeding structure is further configured to distribute the seed balls in the agricultural field. The microprocessor is in communication with the navigation module and is programmed with a self-direction program to autonomously steer the autonomous vehicle platform while distributing the seed balls.

One embodiment of the present disclosure provides an autonomous vehicle platform for selectively performing an in-season management task in an agricultural field while self-navigating between rows of planted crops. The autonomous vehicle platform includes a vehicle base. The vehicle base has a length, width and height, wherein the width is so dimensioned as to be insertable through the space between two rows of planted crops. The base is coupled to a plurality of ground engaging wheels. At least one power train is fixedly coupled to the vehicle base and operably coupled to at least one of the ground engaging wheels. The vehicle further includes a plant sampling structure, a navigation module, and a microprocessor. The plant sampling structure is configured to remove a physical sample of a planted crop for analysis. The mixer is configured to mix seeds with the collected soil to create seed balls. The seeding structure is further configured to distribute the seed balls in the agricultural field. The microprocessor is in communication with the navigation module and is programmed with a self-direction program to autonomously steer the autonomous vehicle platform while removing the physical sample from the planted crop.

One embodiment of the present disclosure provides an autonomous vehicle platform system for selectively performing an in-season management task in an agricultural field while self-navigating between rows of planted crops. The autonomous vehicle platform system includes one or more autonomous vehicle platforms having a vehicle base. The vehicle base has a length, width and height, wherein the width is so dimensioned as to be insertable through the space between two rows of planted crops. The vehicle further includes a navigation module, in-season management task module, and a microprocessor. The navigation module is in communication with one or more obstacle detection sensors and is configured to scan for navigation obstacles. The in-season management task module is configured to control the performance of one or more task. The microprocessor is in communication with the in-season management task module and the navigation module. The microprocessor is programmed with a self-direction program to autonomously steer the autonomous vehicle platform while performing an in-season management task. The microprocessor is also configured to alert an operator when a navigational obstacle is encountered.

The summary above is not intended to describe each illustrated embodiment or every implementation of the present disclosure. The figures and the detailed description that follow more particularly exemplify these embodiments.

BRIEF DESCRIPTION OF THE DRAWINGS

The invention can be more completely understood in consideration of the following detailed description of various embodiments of the invention, in connection with the accompanying drawings, in which:

FIG. 4 is a rear view of the autonomous vehicle platform of FIG. 1.

FIG. 5 is a front view of the autonomous vehicle platform of FIG. 1.

FIG. 12 is a right side view of an autonomous vehicle platform with an articulate frame in accordance with an example embodiment of the disclosure.

FIG. 12A is a close up view of the coupling of FIG. 12.

FIG. 14 is a schematic view depicting the communication between an autonomous vehicle platform, a server, a portable computer, and another autonomous vehicle platform in accordance with an example embodiment of the disclosure.

FIGS. 16A-B are perspective views of an autonomous vehicle platform equipped with an aerial vehicle in accordance with an example embodiment of the disclosure.

FIG. 25 is a perspective view of an autonomous vehicle platform system with a harrow in accordance with an example embodiment of the invention.

FIG. 26 is a perspective view of an autonomous vehicle platform system with a grain drill in accordance with an example embodiment of the invention.

Figure 1:
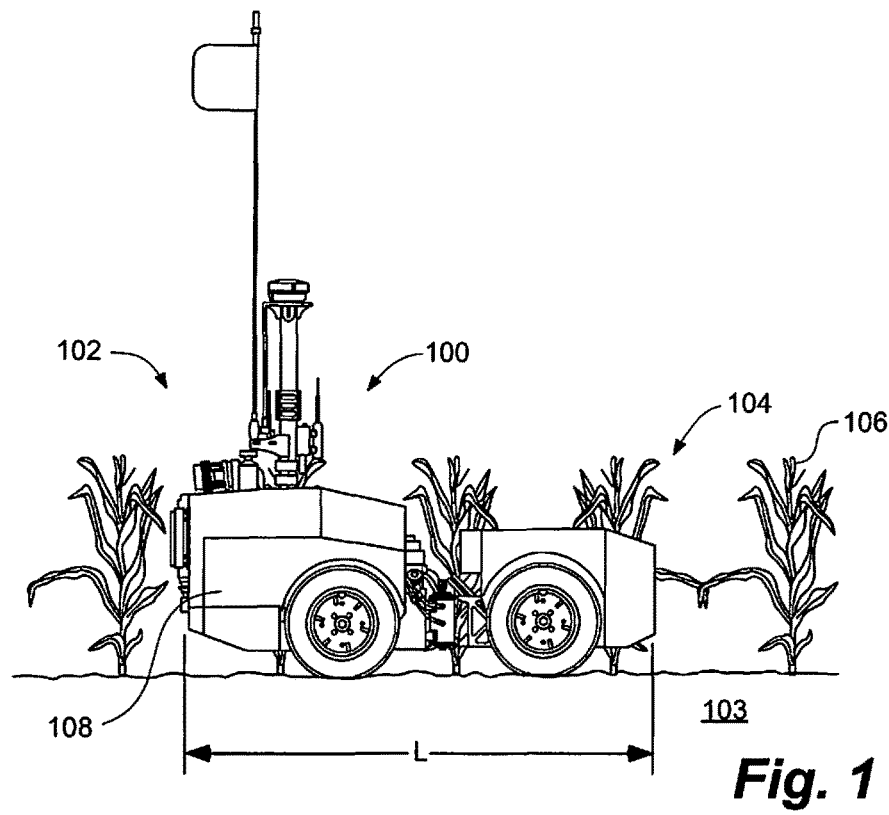
FIG. 1 is a side view of an autonomous vehicle platform in accordance with an example embodiment of the disclosure.
Figure 2:
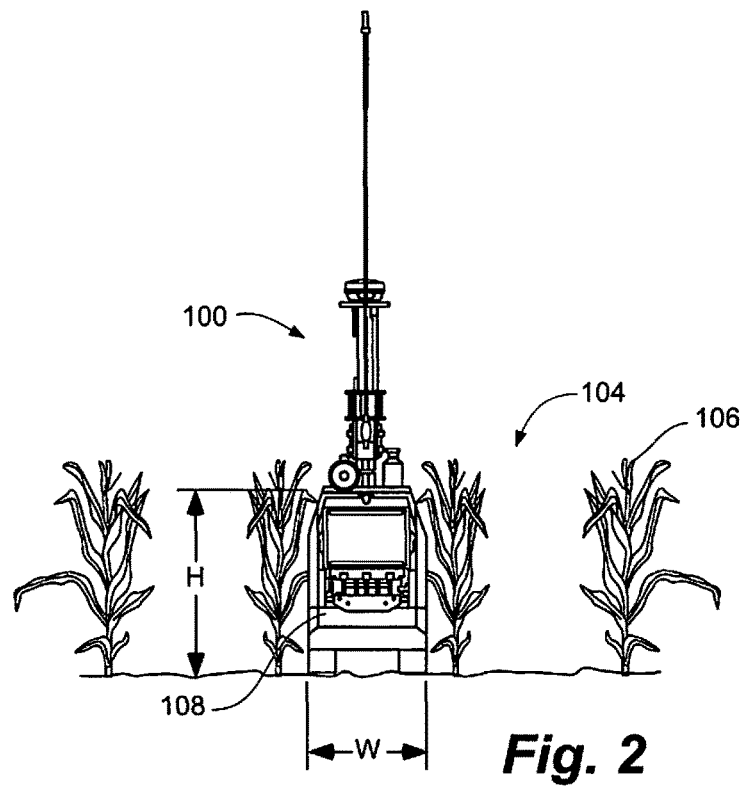
FIG. 2 is a rear view of the autonomous vehicle platform of FIG. 1.

FIG. 29 is a perspective view of a ground engaging implement for collection of soil or biomass in accordance with an example embodiment of the invention.

FIG. 30 is a schematic view of mixer for mixing seeds with soil or biomass in accordance with an example embodiment of the invention.

FIG. 31 is a perspective view of an autonomous vehicle platform system having seed cannons in accordance with an example embodiment of the invention.

FIG. 32 is a top view of an autonomous vehicle platform planting seeds proximate to the base of planted crops in accordance with an example embodiment of the invention.

FIG. 33 is a top view of an autonomous vehicle platform system having a seeding structure in accordance with an example embodiment of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE DRAWINGS

Referring to FIGS. 1-2, an autonomous vehicle platform 100 operates in an agricultural field 102, and often between rows 104 of planted crops 106. Examples of planted crops 106 include corn, soybeans, peanuts, potatoes, sorghum, sugar beets, sunflowers, tobacco, cotton, as well as other fruits and vegetables. Like conventional agricultural equipment (either tractor-drawn or self-propelled), autonomous vehicle platform 100 is configured to perform various management tasks. However, unlike conventional agricultural equipment, autonomous vehicle platform 100 is capable of autonomous navigation between rows 104 of planted crops 106, and for taller crops potentially below the canopy formed by the leaves or canopy of the planted crops 106, thereby permitting the performance management tasks when the height of the planted crops 106 precludes access by conventional agricultural equipment, or in other situations where conventional agricultural equipment cannot easily be operated.

Autonomous vehicle platform 100 has a vehicle base 108 with a length L, width W and height H. The width W of the vehicle base 108 is so dimensioned as to be insertable through the space between two rows 104 of planted crops 106. In one embodiment, width W of vehicle base 108 can be dimensioned to be less than about thirty (30) inches wide and can be used in conjunction with rows 104 of planted crops 106 thirty six (36) inches wide (i.e., crops 106 planted on 36 inch centers). In another embodiment, width W of vehicle base 108 can be dimensioned to about twenty (20) inches wide and can be used in conjunction with rows of planted crops 106 thirty (30) inches wide. In one embodiment, the height H of the vehicle base 108 is so dimensioned as to preclude interference with the canopy of the planted crops 106, thereby permitting travel between rows 104 of tall planted crops 108, without being limited by the height of the planted crops 104, or causing damage to planted crops 104.

Referring to FIGS. 3-9, in one embodiment, autonomous vehicle platform 100 has a plurality of ground contacting wheels 110, tracks, or some combination thereof to move across agricultural field 102. Ground contacting wheels can be operably coupled to vehicle base 108. Autonomous vehicle platform 100 can operate effectively across a range of surface conditions created by different cultivation methods (e.g., no-till, low-till, strip-till, and conventional tillage), and on different soil 103 types with different crops 106 planted the previous year (i.e., over a range of plant residue conditions). In addition, the autonomous vehicle platform 100 can operate on soils 103 that would be too wet for conventional equipment. Given the combination of relatively uneven surfaces and potentially soft ground conditions, in some embodiment, the size of ground contacting wheels 110 is maximized. In one embodiment, autonomous vehicle platform 100 has two or more wheels 110. For example, ground contacting wheel 110 could be a drum whose width spans the width W of the vehicle base 106. In such an embodiment, autonomous vehicle platform 100 can have as few as two ground contacting wheels 110. In other embodiments, autonomous vehicle platform 100 can include three or four ground contacting wheels 110. A greater number of wheels can also be employed. In one embodiment autonomous vehicle platform 100 can have one or more track, possibly in combination with one or more ground contacting wheels 110.

The autonomous vehicle platform 100 has at least one powertrain 112 fixedly coupled to vehicle base 108 and operably coupled to at least one ground contacting wheel 110. In one embodiment, an internal combustion engine 114, fueled by diesel or gasoline, can be the main power source for powertrain 112. In another embodiment a battery can be the main power source for powertrain 112. In yet another embodiment, a conventional engine 114 can be paired with a battery to create a hybrid power system; in this configuration, for example, the battery can power an electrical powertrain 112 and the engine can charge the batteries. In one embodiment, the main power source for powertrain 112 can operate continuously for more than 20 hours per day.

Figure 10:
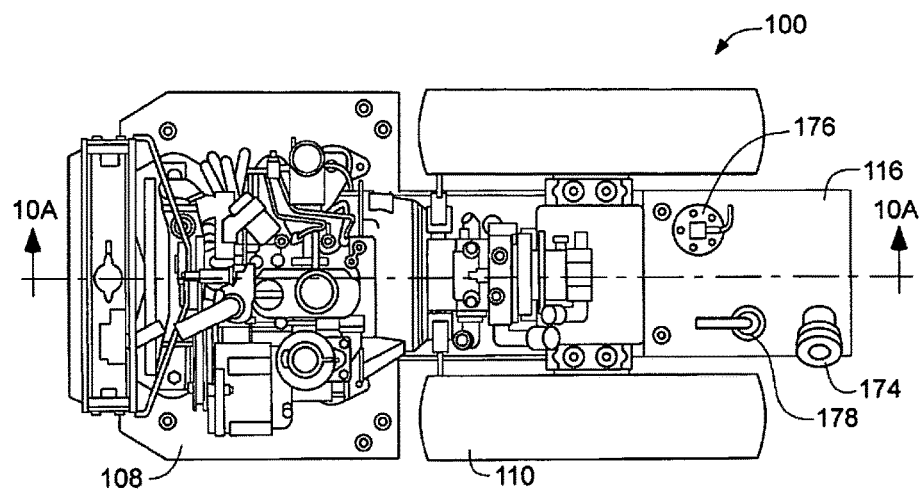
FIG. 10 is a top view of a tank of an autonomous vehicle platform in accordance with an example embodiment of the disclosure.
Figure 10A:
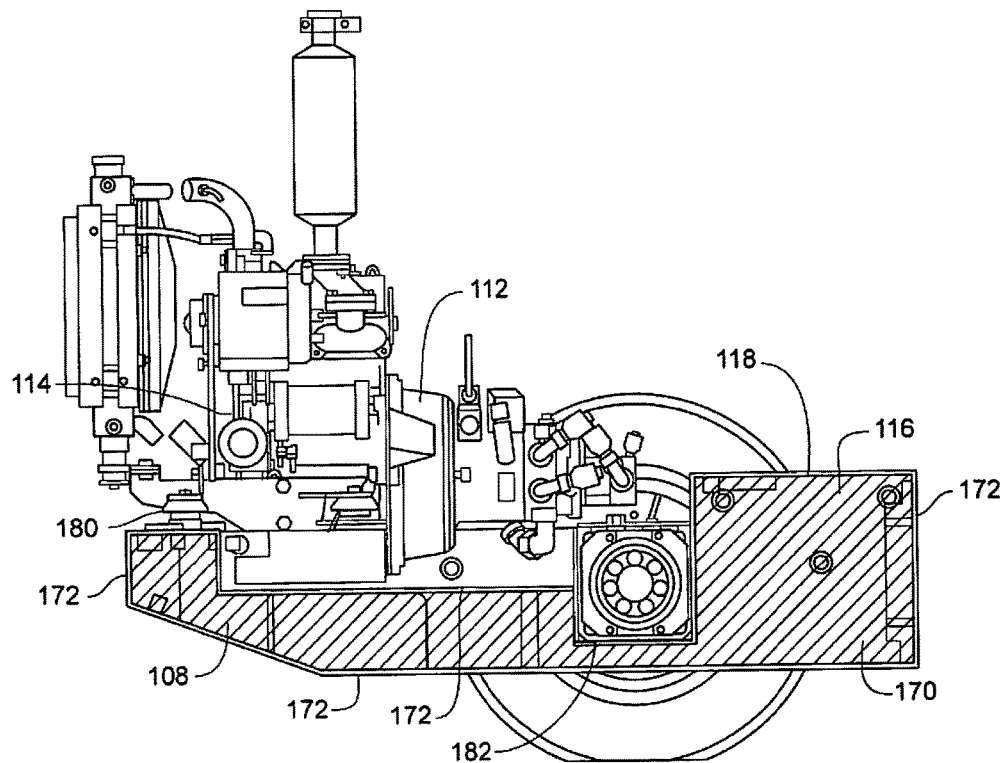
FIG. 10A is a cross sectional view of the tank FIG. 10.
Figure 11:
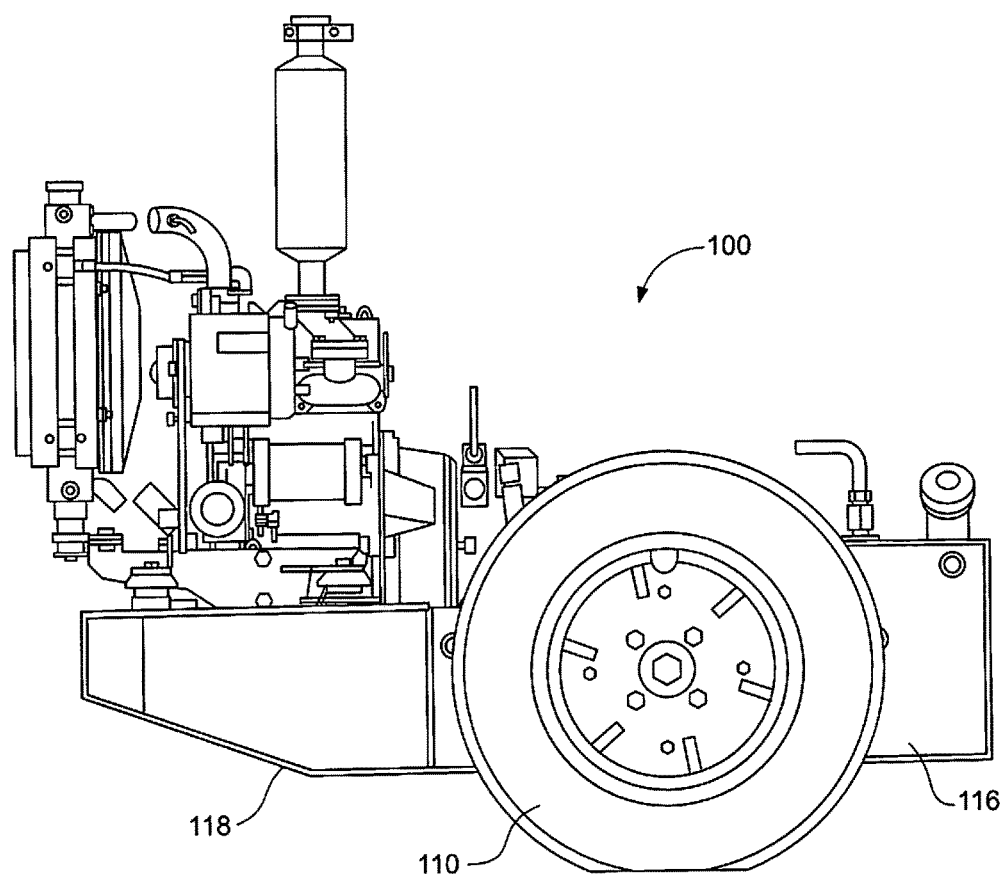
FIG. 11 is a right side view of the tank FIG. 10.

Referring to FIGS. 10-11, in one embodiment, autonomous vehicle platform 100 can include tank 116. In one embodiment, tank 116 can supply the fuel to engine 114. Tank 116 can be employed to carry other substances instead of fuel, for example tank 116 can be configured to carry fertilizer, agricultural chemicals, seeds, water, or a combination thereof for use in performing in-season management tasks. In one embodiment, tank 116 can contain a series of distinct subsections, wherein each subsection is devoted to storage of a given substance. For example, a single tank can contain a first subsection for fuel storage, and a second subsection for storage of liquid fertilizer.

Given the limitations in size of autonomous vehicle platform 100, particularly in the maximum width W and height H that will allow the autonomous vehicle platform 100 to perform the various in-season management tasks between planted rows 104, tank 116 is restricted in size. Additionally, given the range of surface conditions that autonomous vehicle platform 100 must traverse in operation, it is also important to maintain balance and a low center of gravity. Reduction in the overall weight of autonomous vehicle platform is also a consideration. In one embodiment, tank 116 can be slung even with, or below the center of the wheels 110, thereby lowering the center of gravity of the tank 116 and increasing stability of autonomous vehicle platform 100. In one embodiment, the frame 118 of vehicle base 108 is integrated into tank 116. In this embodiment, tank 116 serves as both a reservoir for a payload, as well as the structural support for autonomous vehicle platform 100. In this embodiment, the combination of tank and frame contributes to a lower center of gravity.

In one embodiment, tank 116 can comprise in internal space 170 enclosed within a series of rigid walls 172, wherein at least a portion of the rigid walls 172 are configured provide structural support beyond that necessary to define internal space 170. Rigid walls 172 can be constructed of a heavy gauge metal or other rigid material configured to withstand the external forces experienced by autonomous vehicle platform in operation without significant deformation, thereby precluding the requirement for additional frame support. Tank 116 can include one or more inlet 174, outlet 176 or valve 178 capable of creating a fluid connection between the interior 170 and exterior of tank 116. In one embodiment, rigid walls 172 include one or more engine mounts 180 and one or more ground contacting wheels mounts 182.

In one embodiment, one or more baffle 120 can be added to limit sloshing of the contents within tank 116. For example, in one embodiment, baffle 120 can run from length-wise along vehicle base 108 separating a right and left portion of tank 116. In one embodiment, automated valves or pumps can be used to permit passage of the contents of tank 116 from one tank compartment to another. For example, where a baffle 120 exist to separate a right and left portion of tank 116, if it is known that autonomous vehicle platform 100 will soon encounter a side slope, the contents of tank 116 can be transferred from one side to the other to improve stability.

Figure 13:
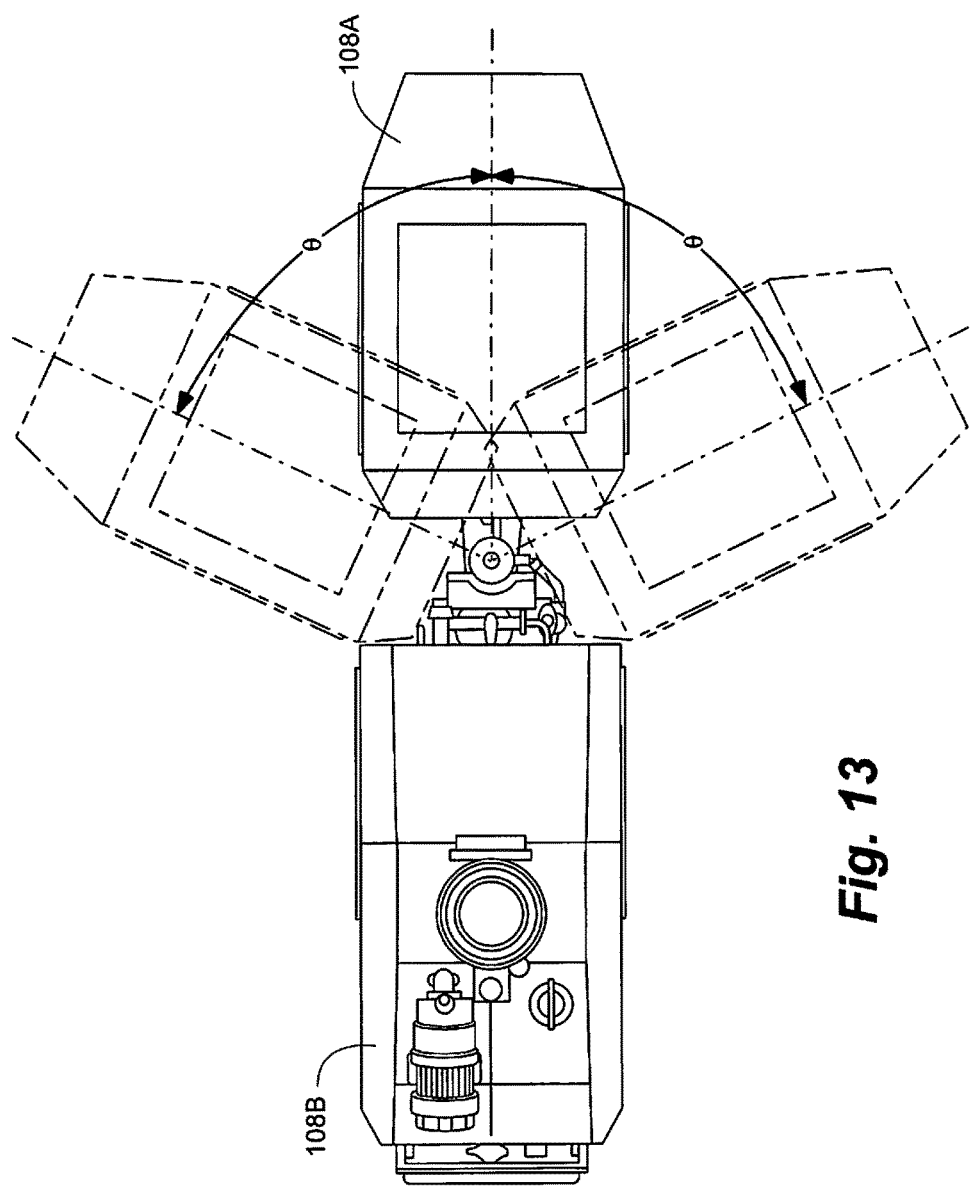
FIG. 13 is a top view of the autonomous vehicle platform of FIG. 12 showing the maximum pivot angle between the first and second portions.

Referring to FIGS. 12-13, in one embodiment, vehicle base 108 can be articulated. In particular, aside from the size, balance and weight restrictions noted above, autonomous vehicle platform 100 is also required to execute tight turns to prevent excessive damage to planted crops 106 when moving from one planted row 104 to the next. Moreover, autonomous vehicle platform 100 is expected to make these turns in a timely manner, without a significant delay. Accordingly, in one embodiment, vehicle base 108 includes a plurality of portions or sections pivotably coupled to one another. In this manner, pivoting one portion relative to another portion allows autonomous vehicle platform 100 to decrease its radius of turn. Further, actively pivoting one portion relative to another portion allows autonomous vehicle platform 100 to steer itself. By articulating frame 118 for steering, it is possible to avoid the requirement for wheels with independent steering that pivot relative to frame 118 and project beyond the autonomous vehicle platform width W when turning or steering between rows. Accordingly, in one embodiment, the articulating frame 118 enables tight turns at the end of the row or steering between rows with adjustments to steering angle that can be made without the wheels sticking out from frame 118 thereby allowing maximization of width W of autonomous vehicle platform for a given row spacing, as well as a lower the center of gravity for a given payload.

In one embodiment, vehicle base 108 is comprised of a first portion 108A and a second portion 108B, wherein first portion 108A is pivotably coupled to second portion 108B via coupling 109. In one embodiment, coupling 109 can be an active pivotal coupling that utilizes hydraulic fluid to forceably pivot first portion 108A relative to second portion 108B. For example, in one embodiment, coupling 109 can be a hydraulically-powered joint. In another embodiment, coupling 109 can be an electric steering motor. Where the vehicle base 108 includes a plurality of portions, each portion can comprise a separate tank 116. In some embodiments, the frame 118 of vehicle base 108 is integrated into the plurality of tanks 116A and 116B.

In one embodiment, coupling 109 permits first portion 108A to pivot relative to second portion 108B substantially along a single plane of motion, thereby permitting autonomous vehicle platform a tighter radius of turn. First portion 108A can be pivoted relative to second portion 108B to a maximum angle of θ in either direction. In one embodiment, θ can be substantially equal 60 degrees. In another embodiment, coupling 109 permits first portion 108A to pivot relative to second portion 108B substantially along two planes of motion, thereby allowing both a tighter radius of turn and increased flexibility when traversing a mound or other uneven terrain. In another embodiment, coupling 109 permits twisting of first portion 108A to pivot relative to second portion 108B, thereby increasing the stability and ground contact when traversing uneven terrain.

Although FIGS. 12-13 depict a autonomous vehicle platform base 108 with two portions 108A, 108B pivotably connected by an articulated coupling 109, autonomous vehicle platform base 108 can in some embodiments include additional portions. For example, in one embodiment, autonomous vehicle platform base 108 can include a third portion, thereby extending the payload by at least one-third, while not impacting the turning radius as the third portion would follow in the tracks of the first two portions. In other embodiment, autonomous vehicle platform base 108 can include more than three portions.

Referring to FIG. 14, in one embodiment, the autonomous vehicle platform 100 includes microprocessor 122 in communication with various modules, wherein each module is constructed, programmed, configured, or otherwise adapted, to carry out a function or set of functions. The term module as used herein means a real-world device, component, or arrangement of components implemented using hardware, or as a combination of hardware and software, such as by a microprocessor and a set of program instructions that adapt the module to implement the particular functionality, which while being executed transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed in microprocessor 122. Accordingly, each module can be realized in a variety of suitable configurations, and should generally not be limited to any particular implementation exemplified herein, unless such limitations are expressly called out. In addition, a module can itself be composed of more than one submodule, each of which can be regarded as a module in its own right. Moreover, in the embodiments described herein, each of the various modules corresponds to a defined functionality; however, it should be understood that in other contemplated embodiments, each described functionality may be distributed to more than one module. Likewise, in other contemplated embodiments, multiple defined functionalities can be implemented by a single module that performs those multiple functions, possibly alongside other functions, or distributed differently among a set of modules than specifically illustrated in the examples herein.

Figure 3:
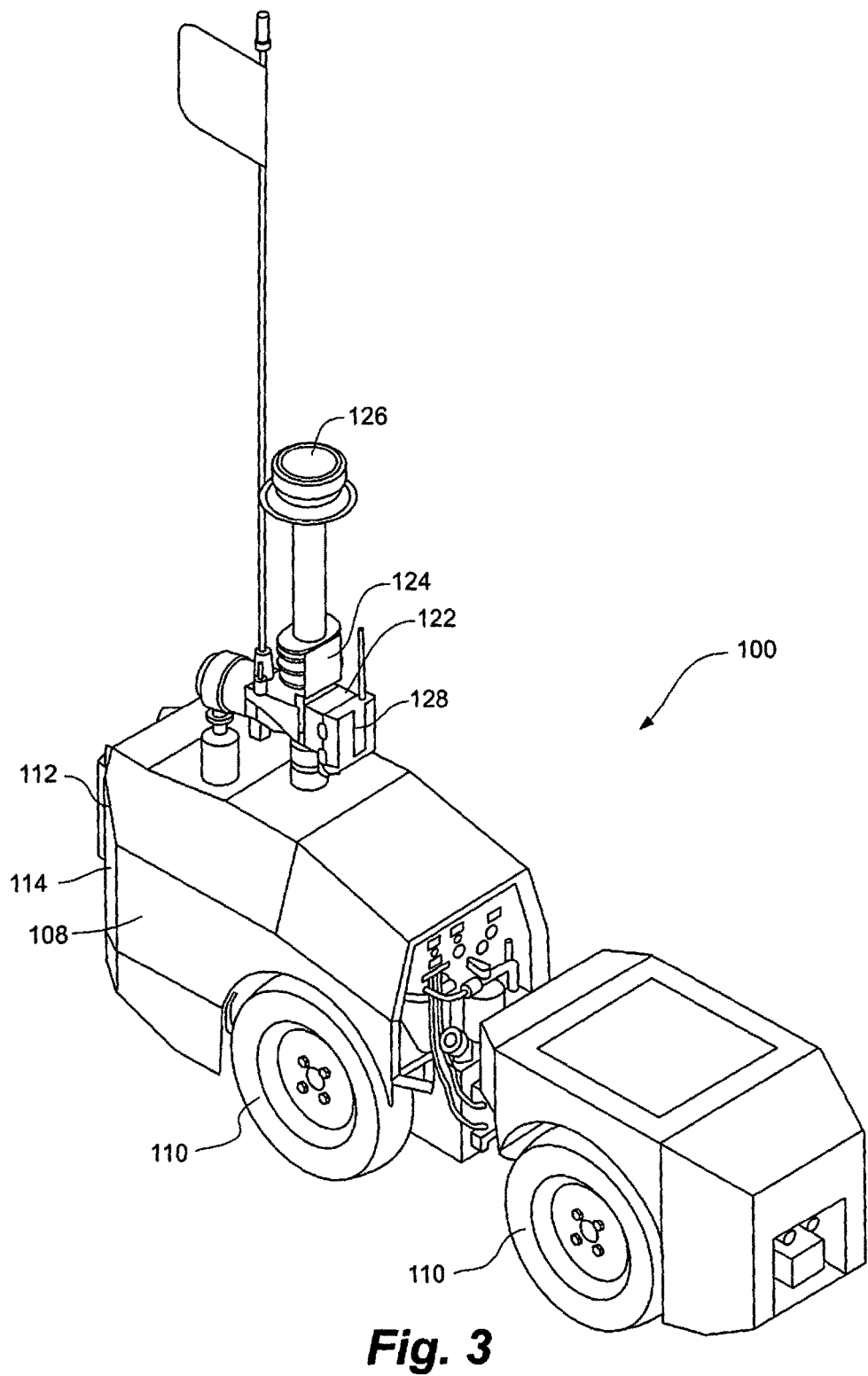
FIG. 3 is a perspective view of the autonomous vehicle platform of FIG. 1.
Figure 6:
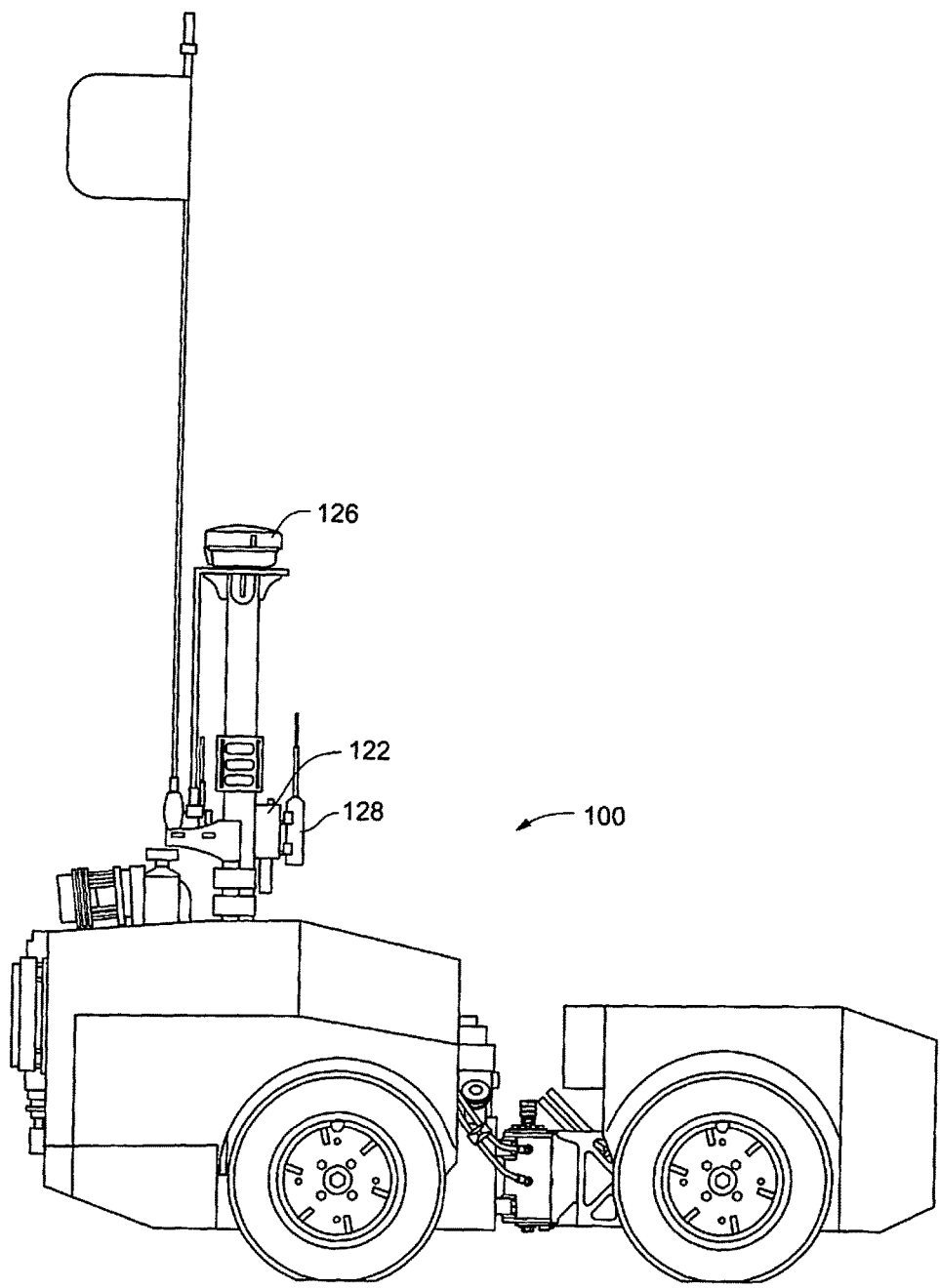
FIG. 6 is a right side view of the autonomous vehicle platform of FIG. 1.
Figure 7:
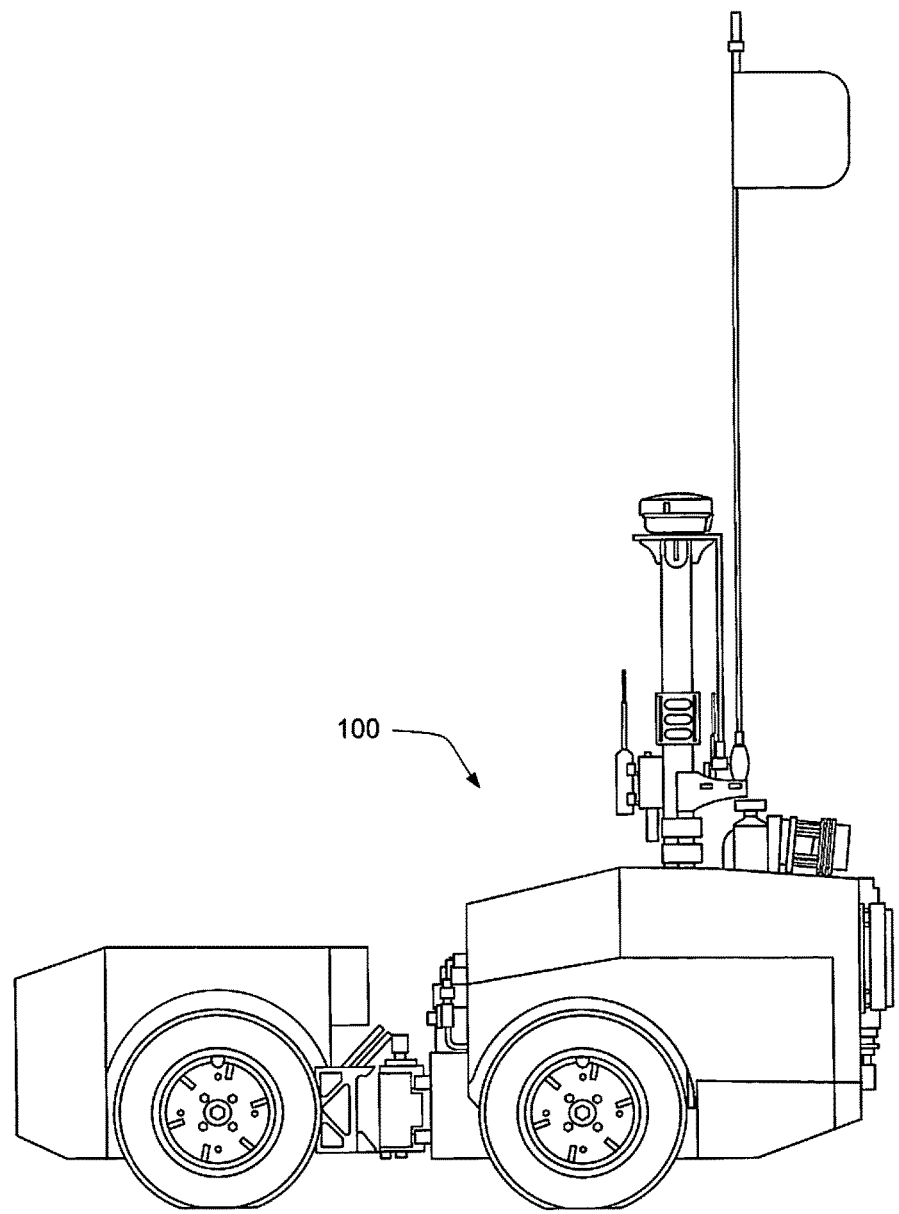
FIG. 7 is a left side view of the autonomous vehicle platform of FIG. 1.
Figure 8:
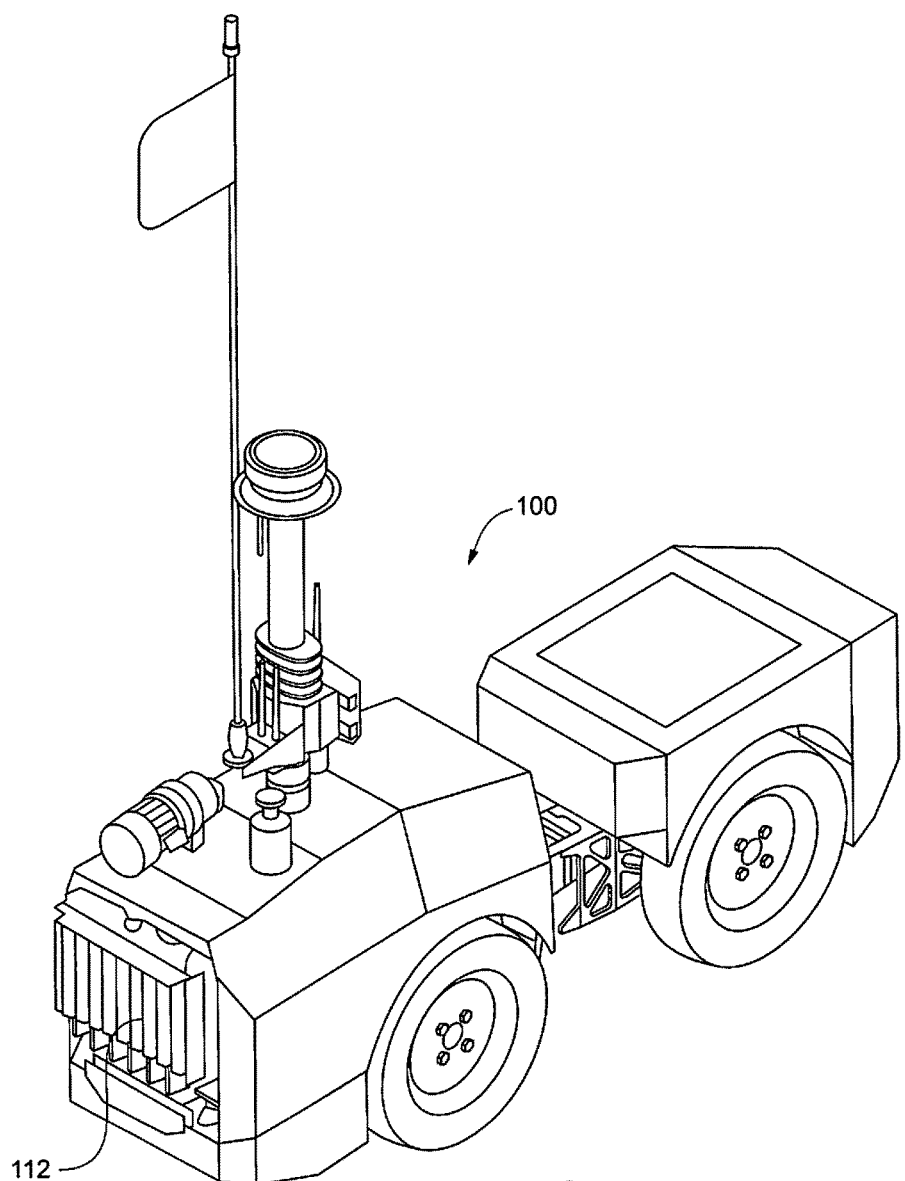
FIG. 8 is a perspective view of the autonomous vehicle platform of FIG. 1.
Figure 9:
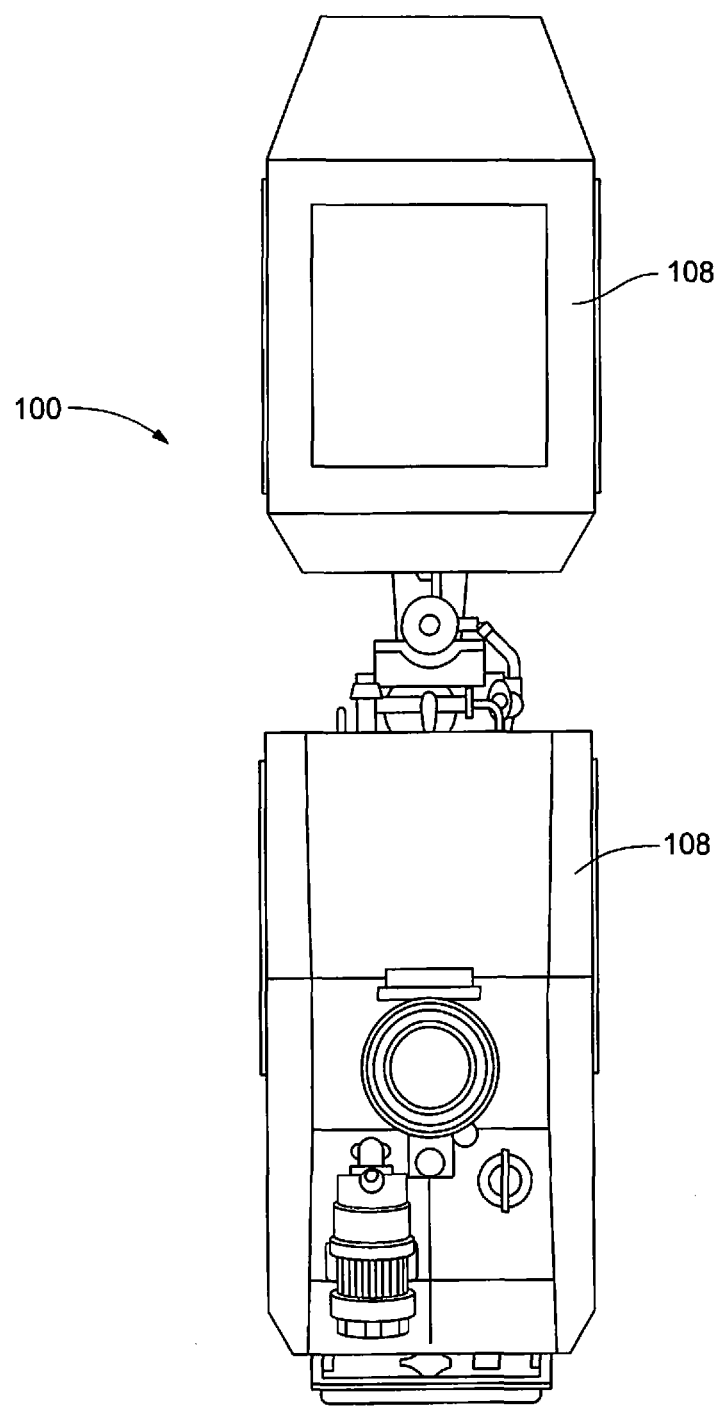
FIG. 9 is a top view of the autonomous vehicle platform of FIG. 1.

In one embodiment, autonomous vehicle platform 100 has a navigation module 124. Navigation module 124 can be configured to receive field orientation information and detect obstacles using a variety of inputs, including existing data about a particular agricultural field 102, as well as navigational data acquired in real time, such as data acquired via onboard cameras, radio communication with a base station, and global positioning system GPS units. A mast 126 (as shown in FIGS. 3 and 6) can function as an antenna and can be in communication with the navigation module 124 to allow for an extended range and improved reception beneath the canopy of the planted crops 106.

Microprocessor 122 can be programmed with a self-direction program and can be in communication with navigation module 124 and other implements or modules, to autonomously navigate the autonomous vehicle platform, and to avoid other autonomous vehicle platforms 100, while selectively performing various in-season management tasks based in part on received field orientation information and detected obstacles. With increased levels of automation, including full autonomy, the need for robust obstacle detection is desirable. For example, an agricultural field 102 can contain various rocks, debris, and other objects that might obstruct the movement of autonomous vehicle platform 100. Small animals, including pets, as well as humans young and old, can also be encountered by the autonomous vehicle platform 100. The autonomous vehicle platform 100 can have onboard capabilities to detect, avoid, navigate around, or as appropriate navigate over a range of obstacles like these. Additionally, when more than one autonomous vehicle platform 100 is autonomously navigating in an agricultural field, the autonomous vehicle platform 100 can communicate with other autonomous vehicle platforms 100 in order to coordinate activities and avoid collisions via communications module 123.

Figure 15:
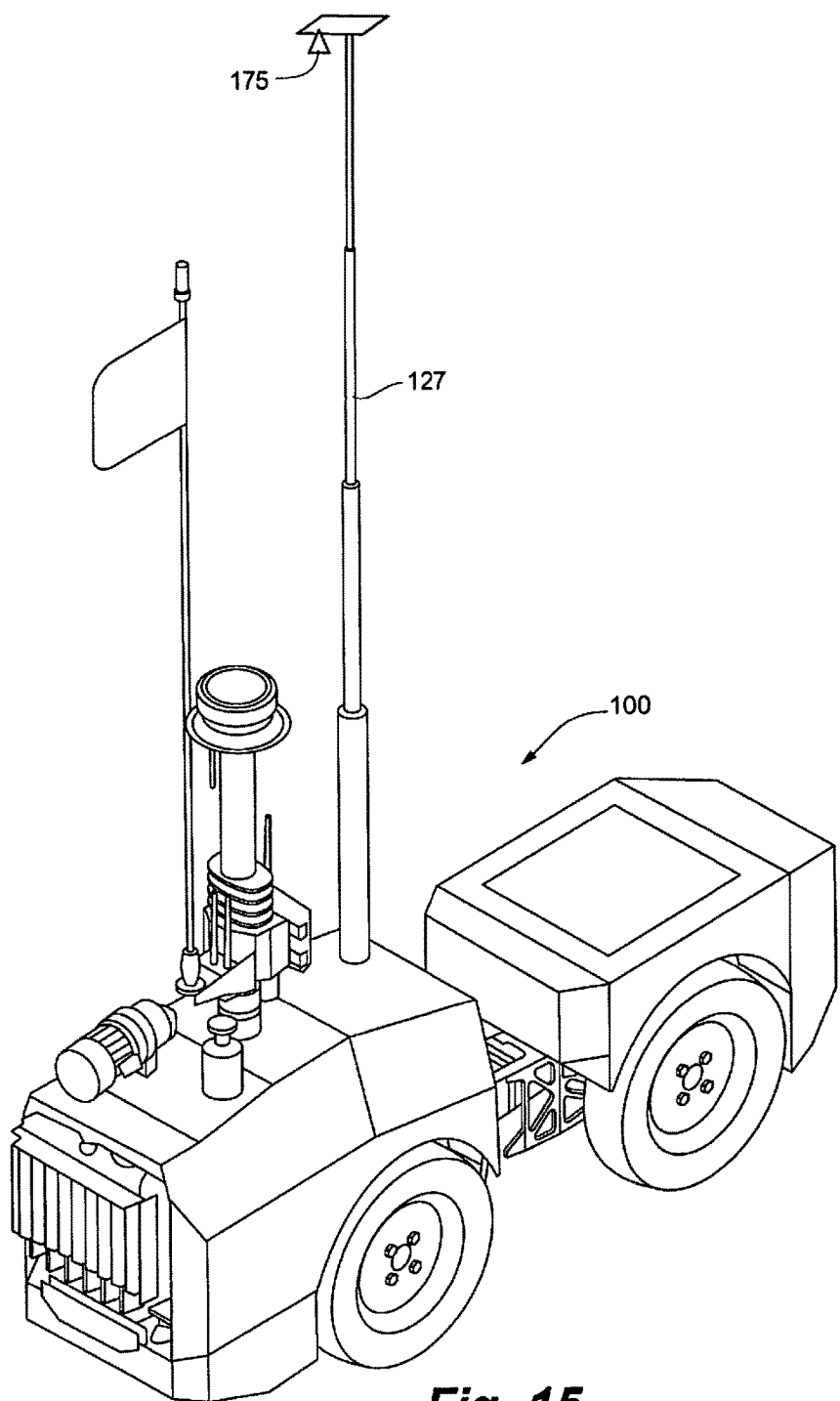
FIG. 15 is a perspective view of an autonomous vehicle platform with a telescoping mast in accordance with an example embodiment of the disclosure.

Referring to FIG. 15, in one embodiment, the onboard capabilities to detect, avoid, navigate around, or as appropriate navigate over a range of obstacles can include a sensor 175, such as one or more cameras, infrared sensors, ultrasonic sensors, or a combination thereof. In one embodiment, sensor 175 is mounted to the top of a telescoping tower or mast 127. Telescoping tower or mast 127 can be deployed periodically, or only as needed. In another embodiment, mast 127 can be deployed in a partially or fully extended state during longer periods of operation.

Referring to FIGS. 16A-B, to further aid in resolving a navigational issue and detecting of obstacles, particularly humans and other living creatures that can rapidly move into the danger zone, autonomous vehicle platform 100 or system 200 can be in communication with one or more aerial vehicles 170. Aerial vehicle 170 can be, for example, an autonomous drone capable of extending the field of view for autonomous vehicle platforms 100 or system 200. In one embodiment, aerial vehicle 170 can include one or more cameras or sensors configured to at least capture an image of the agricultural field 102 where an autonomous vehicle platform 100 is operating. Processing of the imagery captured by autonomous vehicle platform 100 can be performed on the aerial vehicle 170, on one or more autonomous vehicle platforms 100, at a base station, or a combination thereof.

In some embodiments, aerial vehicle 170 is deployed continuously. In other embodiments, aerial vehicle 170 is deployed periodically or on an as needed basis. Aerial vehicle 170 can be in communication with system 200 and autonomous vehicle platform 100 to receive location information. Aerial vehicle 170 can be fully independent of autonomous vehicle platforms 100 or it can be assigned to a particular platform 100. In one embodiment, autonomous vehicle platform 100 includes a docking platform 174 for aerial vehicle 170. Docking platform 174 can include a connection for recharging the power source of aerial vehicle 170. In another embodiment, aerial vehicle 170 can be connected via a tether 173 to autonomous vehicle platform 100. In this embodiment, autonomous vehicle platform 100 remains in position while aerial vehicle 170 is deployed. In other embodiments, autonomous vehicle platform 100 continues to execute its assigned task while aerial vehicle 170 is deployed. In one embodiment, the same operator or team of operators that controls the autonomous vehicle platforms 100 or system 200 can also control the aerial vehicle 170.

Referring again to FIG. 14, autonomous vehicle platform 100 can have a user interface module 128 in communication with microprocessor 122, configured to transmit microprocessor data to a user or operator of autonomous vehicle platform 100, and further configured to receive command data from the user of autonomous vehicle platform 100 for selectively overriding the self-direction program. In some embodiments, user interface module 128 transmits and receives data from server 182. In another embodiment, user interface module 128 transmits and receives data directly from a portable computer 181, such as a laptop, smartphone or tablet. In one embodiment, an operator can receive video, images and other sensor data remotely via wireless communications, and send control signals to selectively override autonomous vehicle platform 100 automation. In one embodiment, the operator can selectively interact in real time via an application on portable computer 181, which communicates directly, or indirectly via server 182, with the autonomous vehicle platform 100 from an onsite location, or a remote location, such as the service contractor or farm headquarter.

In one embodiment, autonomous vehicle platform 100 periodically reports its status or condition. For example, autonomous vehicle platform 100 can communicate a status update to an operator or team of remote operators every 30 seconds. In most instances these status updates are relatively simple, for example, an update can show that autonomous vehicle platform 100 is operating normally or indicate what percentage of a task has been completed. However, in the case where autonomous vehicle platform 100 encounters a situation that cannot be resolved autonomously, a message or alert can be routed to an operator for assistance. These situations include, among other things, that an alert that the autonomous vehicle platform 100 has encountered and obstacle, that autonomous vehicle platform 100 is experiencing an unplanned for idle time, that a malfunction is impacting the proper functioning of autonomous vehicle platform 100, or that a notification that the autonomous vehicle platform's 100 payload or fuel supply is running low. Such a message can include, for example, information that autonomous vehicle platform 100 or system 200 has been stopped for a particular reason, one or more images of a situation that autonomous vehicle platform 100 has encountered, a variety of statistics, such as heading, tractions, engine status, tank status, tilt angle, a video or series of images of the last several seconds of operation before the message was routed, or a combination thereof. Using this information, in one embodiment, the operator or team of operators can remotely resolve the situation. For example, the operator can select one of several preprogrammed commands or options, such as hold position, break through planted crops 106 and proceed to next row, or back up and start again on adjacent row. In addition, the operator can take remote control of autonomous vehicle platform 100 and drive it for specified period of time to get it out of the situation.

Where more than one autonomous vehicle platform 100 encounters a situation and multiple messages are sent at or near the same time, the messages can be prioritized by server 182 or portable computer 181, so that the situations deemed most critical can be addressed in an appropriate order. In addition to processing and displaying navigational, status, and situation alert information, server 182 or portable computer 181 can also store such data for each autonomous vehicle platform 100 to be utilized for the creation of a map or chart to illustrate the frequency and location of problems encountered. A map created from such data, or other information, such as proximity to a farm house, can be used to rank multiple autonomous vehicle platforms 100 in terms of the potential risk of encountering obstacles and can also be used in the prioritization of multiple situation messages received at or near the same time.

Figure 17:
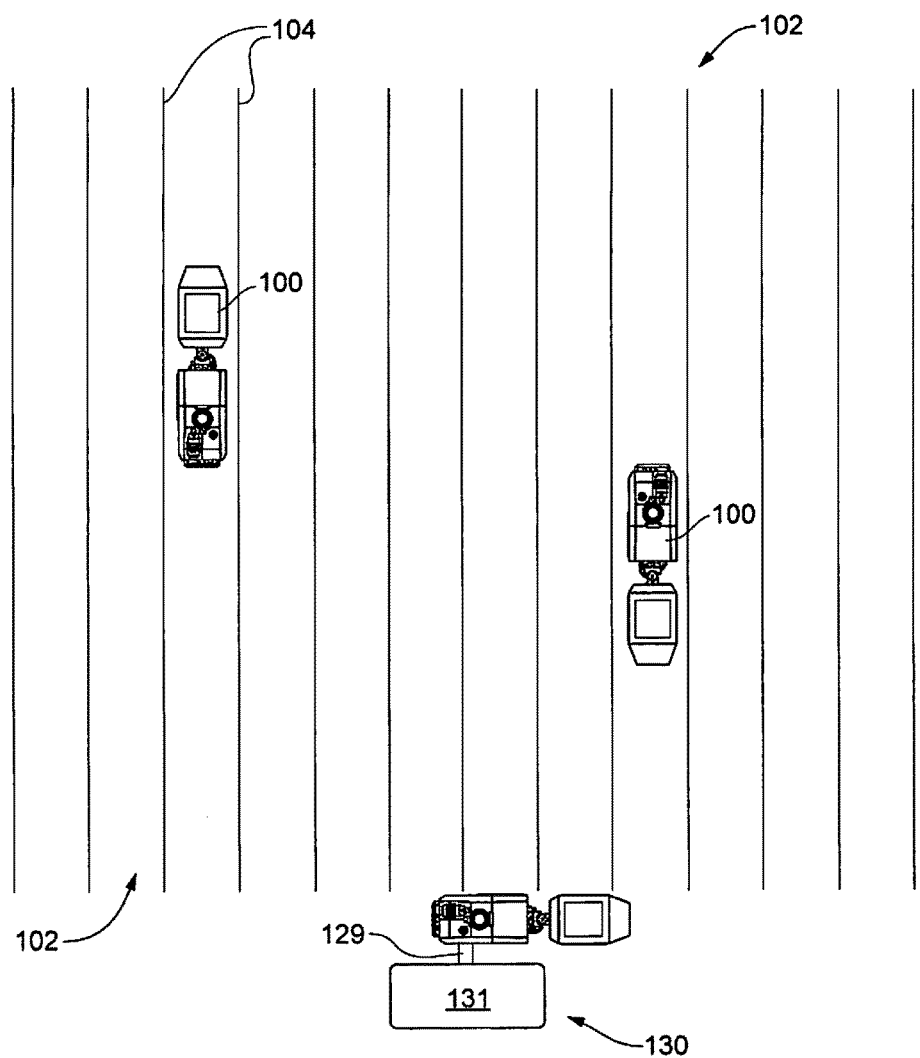
FIG. 17 is a top view of an autonomous vehicle platform system having a fertilization structure in accordance with an example embodiment of the invention.

Referring to FIG. 17, in one embodiment, one or more autonomous vehicle platform 100 can be used together in an autonomous vehicle platform system 200. In one embodiment, autonomous vehicle platform system can further comprise a refilling station 130. Refilling station 130 can include a refilling tank 131 and a refilling applicator 129. In one embodiment, the refilling station 130 can have one or more retractable hoses that can be pulled several rows 104 into agricultural field 102 thereby relocating the refilling applicator some distance from the tank. In one embodiment a refilling station 130 can have a plurality of retractable hoses, creating several refilling locations from a single refill tank 116.

Autonomous vehicle platform 100 can be programmed to periodically return to refilling station 130. In one embodiment, autonomous vehicle platform 100 can be programmed to compare the status of autonomous vehicle platform criteria to a programmed threshold, and to return to a refilling station 130 for servicing when the status of autonomous vehicle platform criteria conforms to the programmed threshold. For example, autonomous vehicle platform 100 can be programmed with a low threshold of fuel or fertilizer; when autonomous vehicle platform 100 senses that the actual amount of fuel or fertilizer is at or below the programmed low threshold, autonomous vehicle platform 100 can autonomously navigate itself to refilling station 130. In one embodiment, a plurality of autonomous vehicle platforms 100 communicate with each other to avoid conflicts while returning to refilling station 130 to recharge their supply of agricultural chemicals, seeds, fuel, water, or other supplies.

In one embodiment, the placement of refilling station 130 can be guided by a logistics software program. The logistics software can be loaded on microprocessor 122, server 182, portable computer 181, or a combination thereof. The logistics software program can account for the anticipated quantities of supplies to be used. These anticipated quantities can be computed using a variety of inputs, including the field layout, topography, soil condition, and anticipated weather conditions, and other conditions that may increase or decrease the amount of fuel, fertilizer, agricultural chemicals, seed, water, or combination thereof to be used. In one embodiment, the goal of the logistics software is to minimize the time a given autonomous vehicle platform 100 is traveling to and from the refilling station 130 to refill tank 116. In one embodiment, the logistics software is tied to operation of the one or more autonomous vehicle platforms 100 in the execution of an in-season management task. For example, in one embodiment, logistics software can provide updates to an operator or team of operators of where to position refilling stations 130 relative to agricultural field 102, where each of the autonomous vehicle platforms 100 should be initially positioned relative to agricultural field 102, and when and where the autonomous vehicle platforms 100 should be moved upon completion of their assigned task.

Among other logistics solutions required for optimal operation, autonomous vehicle platform 100 can carry a pre-calculated payload needed to complete an in-season management task from the perspective of the refilling station 130. This pre-calculated amount of fuel and fertilizer goes hand-in-hand with appropriately sizing tank 116. Pre-calculating the amounts of fuel, fertilizer, agricultural chemicals, seed, water, or combination thereof mitigates the possibility of autonomous vehicle platform 100 having to transit more than once over the same path between rows 104.

Referring to FIGS. 18-33, in one embodiment autonomous vehicle platform 100 can include an in-season management task structure 132. In one embodiment, the in-season management task structure 132 is one of a fertilization structure, a protective chemical application structure, a field mapping structure, a soil sampling structure, a seeding structure, and a combination thereof. The term "in-season management task structure" is not intended to limit the variety of management task applications only to the in-season timeframe; rather the term is employed to indicate that the variety of management task applications can also be used at other times. For example, the autonomous vehicle platform 100 can be employed to automate some functions, such as fertilizing, application of protective chemicals, mapping, soil sampling, seeding, and a combination thereof, outside of the in-season timeframe, as well as during the in-season timeframe.

Figure 18:
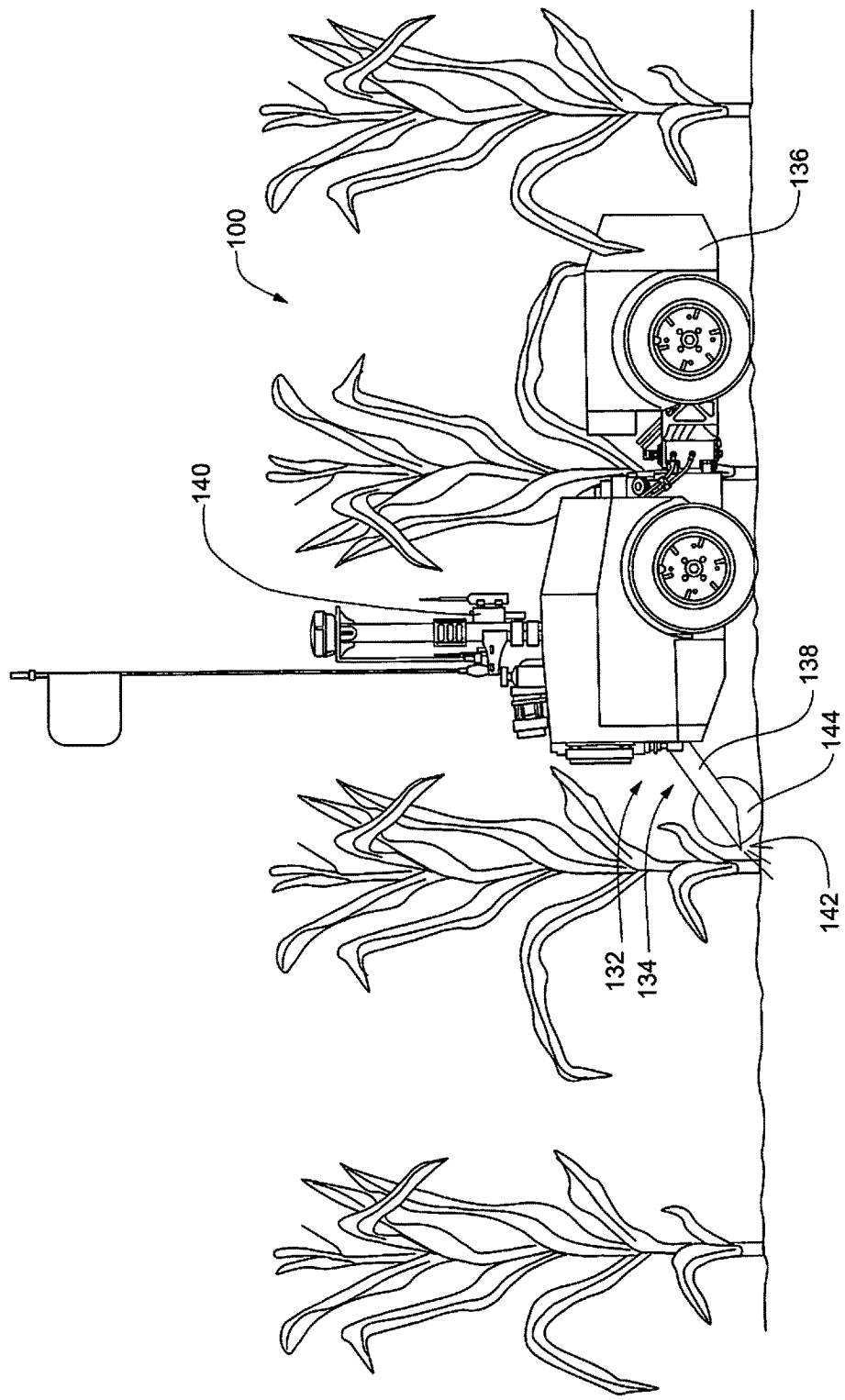
FIG. 18 is a side view of an autonomous vehicle platform system having a fertilization structure in accordance with an example embodiment of the invention.

With special reference to FIG. 18, in one embodiment, autonomous vehicle platform 100 can include a fertilization structure 134. In one embodiment, fertilization structure 134 can comprise a fertilizer tank 136, a fertilization applicator 138 and a fertilization module 140. In one embodiment, tank 116 can comprise fertilizer tank 136. Fertilization structure 134 can be in communication with microprocessor 122, via fertilization module 140. Fertilization applicator 138 can be configured to selectively apply fertilizer to the soil 103 of an agricultural field 102 or base of planted crops 106. Fertilization applicator 138 can be positioned in front, underneath, or behind the wheels 110 (or tracks), or on the wheels 110 of autonomous vehicle platform 100.

The autonomous vehicle platform 100 can utilize a liquid fertilizer known as UAN (urea-ammonium-nitrate), other liquid, dry, or granular fertilizers. In one embodiment, the fertilizer tank 136 can hold less than 20 gallons of UAN. In another embodiment, the fertilizer tank 136 can hold less than 40 gallons of UAN. In another embodiment, the fertilizer tank 136 can hold less than 50 gallons of UAN. In embodiments that include an articulated base with a plurality of portions, the fertilizer tank can hold more than 50 gallons of UAN. The fertilization tank 136 can be pressurized by compressed air, which can be supplied from a central compressor to aid in the delivery of fertilizer. Alternatively, the fertilizer can be pumped from the fertilization tank 136 into the fertilization applicator 138. Automated valves and pumps can further be used to inject the fertilizer solution into the soil 103.

Figure 19:
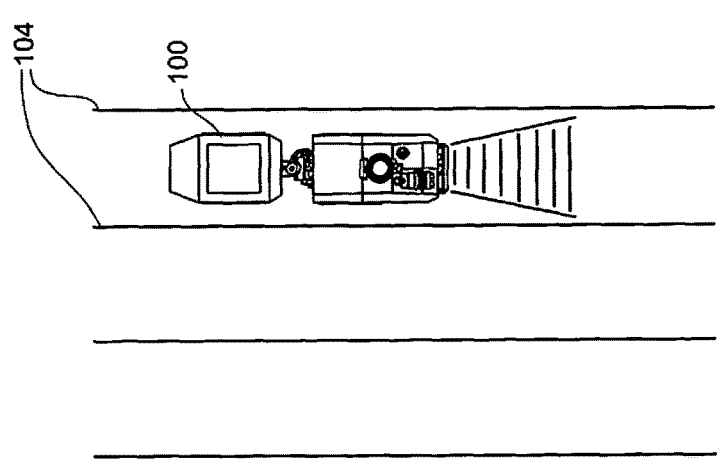
FIG. 19 is a top view of an autonomous vehicle platform applying fertilizer substantially between two rows of planted crops in accordance with an example embodiment of the invention.

With special reference to FIG. 19, in some embodiments, fertilizer can be applied substantially between two rows 104 of planted crops 106; in this manner the autonomous vehicle platform 100 effectively treats one-half of each row of planted crop 106. With special reference to FIG. 20, in other embodiment, fertilizer can be applied in a combination of locations, including one or more locations besides substantially between two rows 104 of planted crops 106, including application of fertilizer proximate to the base of planted crops 106. In this manner autonomous vehicle platform 100 effectively treats two rows of planted crop 106 on each pass, thereby doubling its coverage in comparison to fertilization substantially between two rows 104 of planted crops 106.

Referring again to FIG. 18, depending on a range of variables, including soil type, soil moisture, and plant residue, various approaches can be used for applying fertilizer. In one embodiment, autonomous vehicle platform 100 can include a spray nozzle 142 to spray fertilizer on soil 103. In one embodiment, autonomous vehicle platform 100 can include a circular disc, or coulter 144, that cut slots into the soil 103. The fertilizer can be sprayed into this slot directly behind coulter 144. In one embodiment, a protective metal knife can be used directly behind the coulter 144, with a tube passing down behind the knife to introduce the fertilizer solution into soil 103. In some embodiments, weights can be added to the autonomous vehicle platform 100 to ensure sufficient downward pressure to operate the coulter 144.

Figure 20:
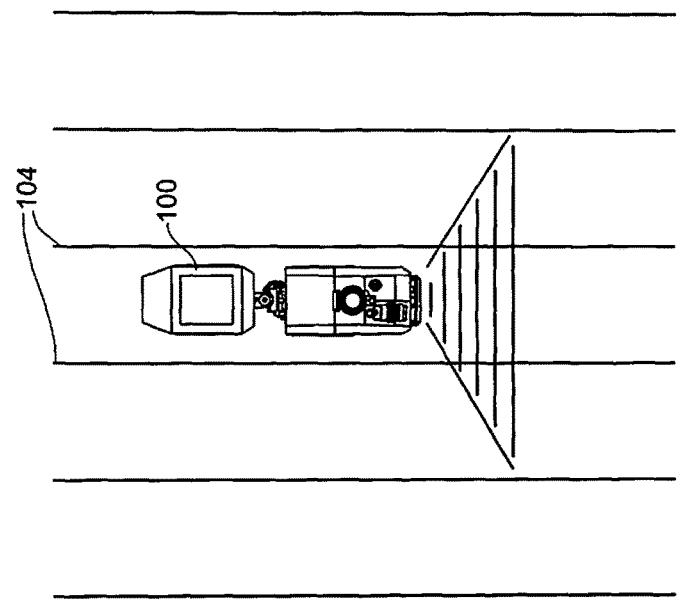
FIG. 20 is a top view of an autonomous vehicle platform applying fertilizer proximate to the base of planted crops in accordance with an example embodiment of the invention.

In another embodiment, autonomous vehicle platform 100 can apply dry fertilizer pellets in a precise manner directly proximate to the base of a planted crop 106 or substantially between rows of planted crops 108, for example, by broadcasting the pellets, or by injecting the pellets several inches into the soil in a manner that does not damage the crop's root system. In one embodiment, a rolling, spiked drum is used for this purpose. In another embodiment, autonomous vehicle platform 100 "shoots" pellets into the ground using a high-pressure air system much like what is found in air rifles that fires a BB or a pellet. Fertilizer can be applied on either side of autonomous vehicle platform 100 between rows (as depicted in FIG. 19) or across several rows (as depicted in FIG. 20).

When a UAN solution is sprayed proximate to the base of planted crops 106, a stabilizer can be added to prevent hydrolysis of the urea to ammonia gas lost to the atmosphere through volatilization. However, rain or application of irrigation water following fertilizer application can eliminate the need to treat the UAN with a stabilizer. A focused spray to specifically avoid application to crop residue can eliminate the amount of fertilizer inadvertently immobilized. In one embodiment, the focused spray can be under high pressure to at least partially inject the fertilizer beneath the surface of soil 103. In such embodiments, the liquid fertilizer can be applied between rows (as depicted in FIG. 19) or across several rows (as depicted in FIG. 20).

In addition to application of fertilizer as a spray proximate to the base of planted crops 104, the autonomous vehicle platform 100 can follow the fertilizer application with a spray of water, as "simulated rain." In other embodiments, the fertilizer can be mixed with water or another additive before it is applied to the soil. Thus, the autonomous vehicle platform 100 can have two tanks, one for fertilizer and one for water. The simulated rain application helps to wash the UAN fertilizer into the soil, thereby reducing hydrolysis on the soil 103 surface.

In yet another embodiment, the fertilizer can be mixed with soil or other matter to form a fertilizer ball that can be distributed, injected, or shot into soil 103. The description of mixing cover crop seeds with soil or other matter equally applies to the creation of seed balls described infra.

In one embodiment, autonomous vehicle platform 100 can monitor fertilization. For example, monitoring of the flow of nutrients into the soil 103 can be provided to a user during fertilizing operations. In one embodiment, autonomous vehicle platform 100 can detect and rectify a situation where soil 103 becomes stuck to the fertilization applicator 138, spray nozzle 142, coulter 144, or other parts of the fertilization structure 134. In one embodiment, autonomous vehicle platform 100 can be equipped to monitor the depth at which fertilizer is injected.

Use of the autonomous vehicle platform 100 can also be guided by external inputs, such as weather data. For example, a decision on whether to fertilize at a given point in time can be influenced by inputs like weather data that ultimately predict the effectiveness of applying fertilizer within a given time window. For example, fertilizing operations early in the season can be delayed if a predicted rain storm is likely to wash a substantial portion of the added fertilizer off the field. Alternatively at other times, fertilizing applications might be timed in advance of a rain storm if that predicted moisture would help move the fertilizer down through the soil profile to the crops' roots.

In some embodiments, autonomous vehicle platform can include a protective chemical application structure, configured to apply one of a herbicide, a pesticide, a fungicide, or a combination thereof to planted crops 104 or other vegetation including unwanted weeds. In some embodiments, autonomous vehicle platform 100 can detect which planted crops 104 needs a particular protective chemical or combination thereof and apply that protective chemical or combination thereof using a sprayer on a mast or a robotic arm. Such an approach can have the potential of reducing the volume of protective chemicals applied.

Figure 21:
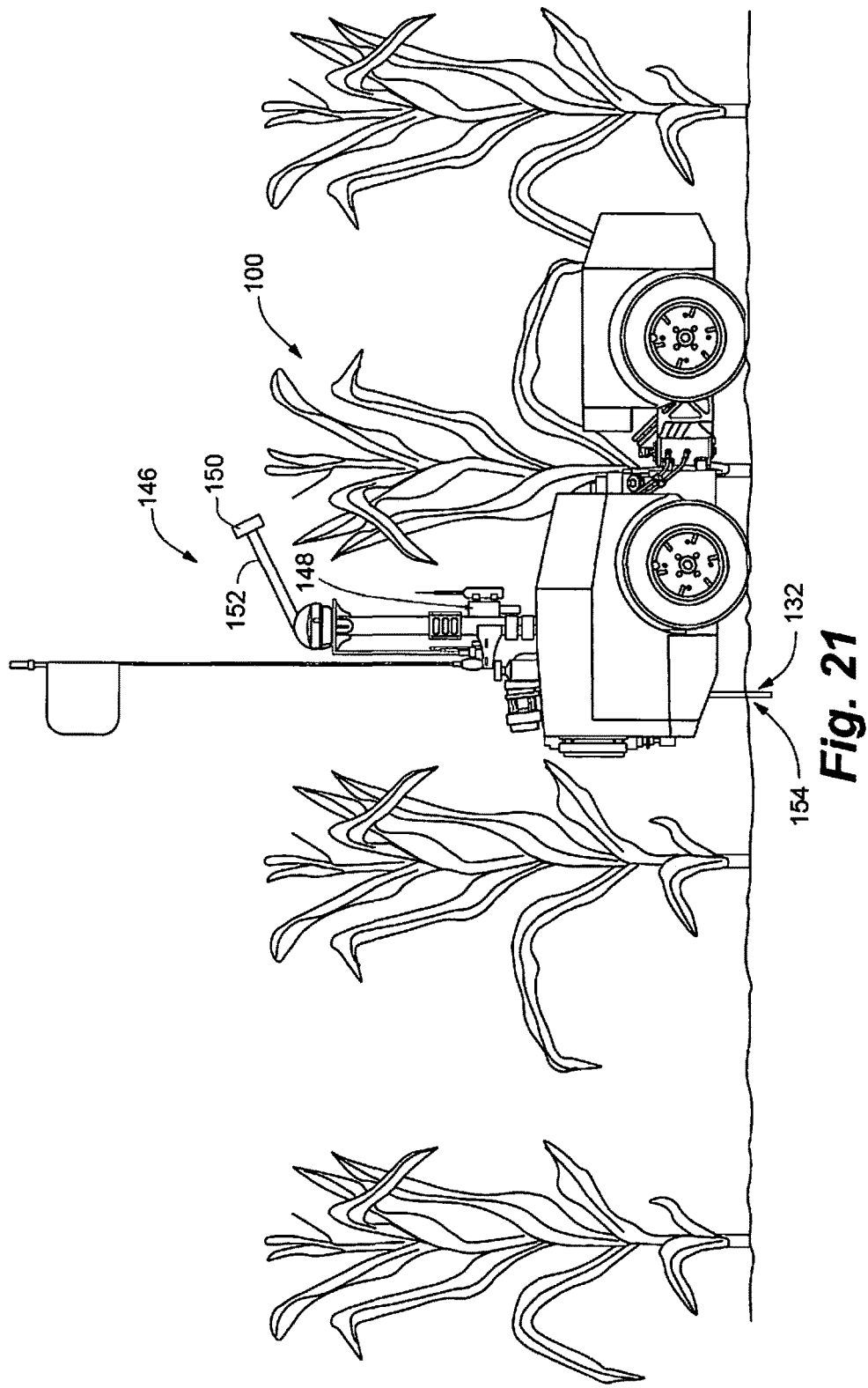
FIG. 21 is a side view of an autonomous vehicle platform system having a field mapping structure and soil sampling structure in accordance with an example embodiment of the invention.

With special reference to FIG. 21, in one embodiment, autonomous vehicle platform 100 can include a field mapping structure 146, configured to map planted crop 108 conditions as well as other parameters. In one embodiment, the goal of the field mapping structure 146 is to guide the application of fertilizer. For example, in areas where planted crop 106 conditions indicate that more or less nutrients are required, the autonomous vehicle platform 100 can adjust fertilizer output as needed.

In one embodiment, fertilization structure 146 can comprise a field mapping module 148 and one or more sensor 150 configured to monitor the conditions of a planted crop 106. For example, sensor 150 can use optical or other measurements to determine the abundance of plant pigments, such as chlorophyll, or other key parameters. In one embodiment, sensor 150 can observe conditions from below planted crops 108. In other embodiment, sensor 150 can be mounted on a robotic arm 152 to observe planted crops 106 conditions above autonomous vehicle platform 100. In one embodiment, mapping module 148 and sensor 150 can be in communication with microprocessor 122.

In one embodiment, autonomous vehicle platform 100 can include a soil sampling structure 154, configured to measure soil conditions, as well as other parameters. In one embodiment, the goal of the soil sampling structure 154 is to guide the application of fertilizer. For example, in areas where soil 103 conditions indicate that more or less nutrients are required, the autonomous vehicle platform 100 can adjust fertilizer output as needed. In one embodiment, soil sampling structure 103 can comprise a soil sampling module 156 and one or more soil probe 158 configured to monitor the conditions of the soil 103. In one embodiment, soil sampling module 156 and soil probe 158 can be in communication with microprocessor 122. In one embodiment, autonomous vehicle platform 100 can insert soil probe 158 into the soil 103, while observing planted crops 106 conditions via sensor 150.

Figure 22:
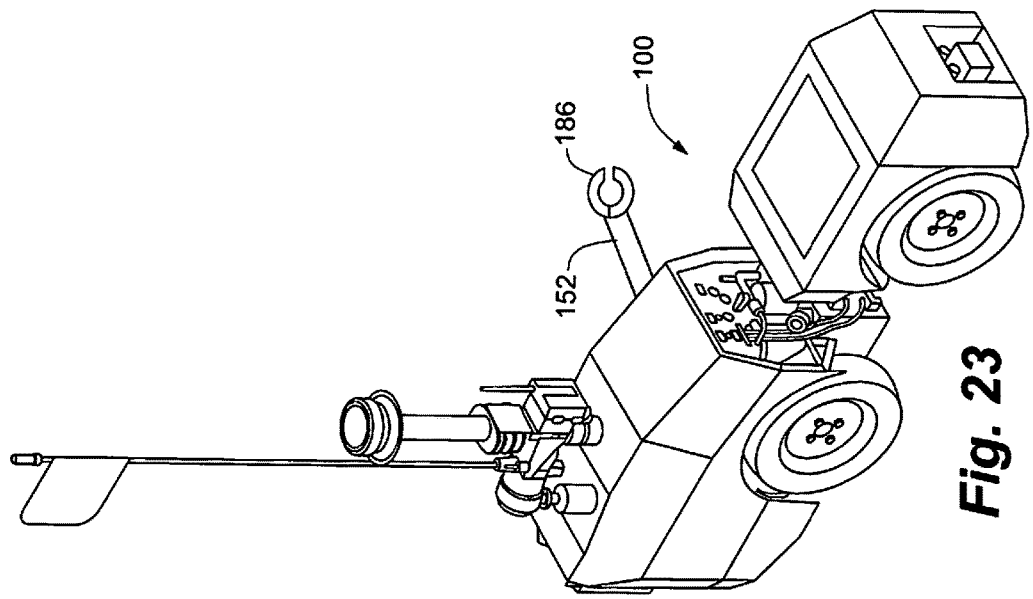
FIGS. 22-23 are perspective views of an autonomous vehicle platform system having a biomass sampling device attached in accordance with an example embodiment of the invention.
Figure 23:
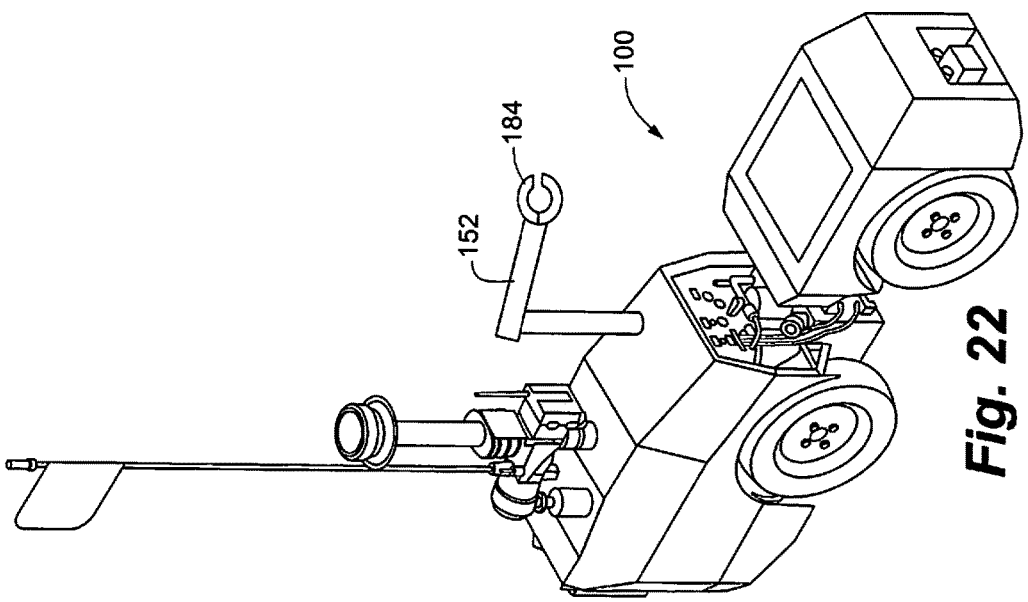

With special reference to FIGS. 22-23, in some embodiments, autonomous vehicle platform 100 can include a device, such as a leaf clip 184 or leaf punch 186, for physical sampling of the planted crops 106. While autonomous vehicle platform 100 is traveling through planted rows 104, or while it is stopped, robotic arm 152 can manipulate device 184, 186 into position for collection of a biomass sample. Furthermore, sampling can be conducted at various heights of the planted crops 106—as some crops tend to show different characteristics on leaves towards the top of the plant (e.g., corn first shows nitrogen deficiency in its lower leaves because the plant moves nitrogen upward toward the leave that are exposed to more sunlight). Thereafter, the physical sample can be analyzed at the autonomous vehicle platform 100 or cataloged or tagged for later analysis.

Physical samples analyzed in agricultural field 102 can be subjected to a measurement of light absorption, information gained from this process is useful in estimating a plant's chlorophyll, which can be used to predict a plant's nitrogen sufficiency. Where the autonomous vehicle platform 100 is applying fertilizer and it is found that localized planted crops 106 are lagging behind the planted crops in other parts of the field, the dispensed amount of fertilizer can be increased to boost local nitrogen levels. In other embodiments, information from the NDVI test is recorded for later use.

In one embodiment, autonomous vehicle platform 100 can be programmed with an algorithm to improve efficiency in real-time plant monitoring. For example, if autonomous vehicle platform 100 is programmed to stop periodically to take measurements, the algorithm can analyze these measurements to determine how much they vary from one another. Where adjacent measurements do not vary substantially, the algorithm can enable autonomous vehicle platform 100 to increase the distance between monitoring locations, thereby effectively speeding up the monitoring process.

In addition to data collected via sensor 150 and soil probe 158, data from crop planting operations can be used create a "base map" from which the autonomous vehicle platform 100 can navigate. Such a base map can detail the precise location of individual rows 104 of planted crop 106, or even the location of individual plants 106.

In some embodiments, the map can leverage existing farmer data. For example, it is well known that farmers are increasingly using GPS-enabled systems during their planting operations, sometimes referred to as an "as-planted map." In many cases, these maps show the layout of the rows on a field. Where an "as-planted map" is available, the field mapping module 148, the autonomous vehicle platform 100 or another component of the system 200, can access the "as-planted map" to provide information for orienting the autonomous vehicle platform 100 on the agricultural field 102.

Generated maps can also include obstacles. For example, in one embodiment, field mapping module 148 can work in cooperation with the imaging capabilities of sensor 175 or aerial vehicle 170 for the purpose of producing an accurate real-time map. The base map can also describe the soil 103 types and field topography—including measurements made using LIDAR that describe drainage patterns on a field. A user can further interact with the map, via an interface, adding in expert knowledge. For example, the existence of different crop varieties or typically-wet areas can be added by the user.

Figure 24:
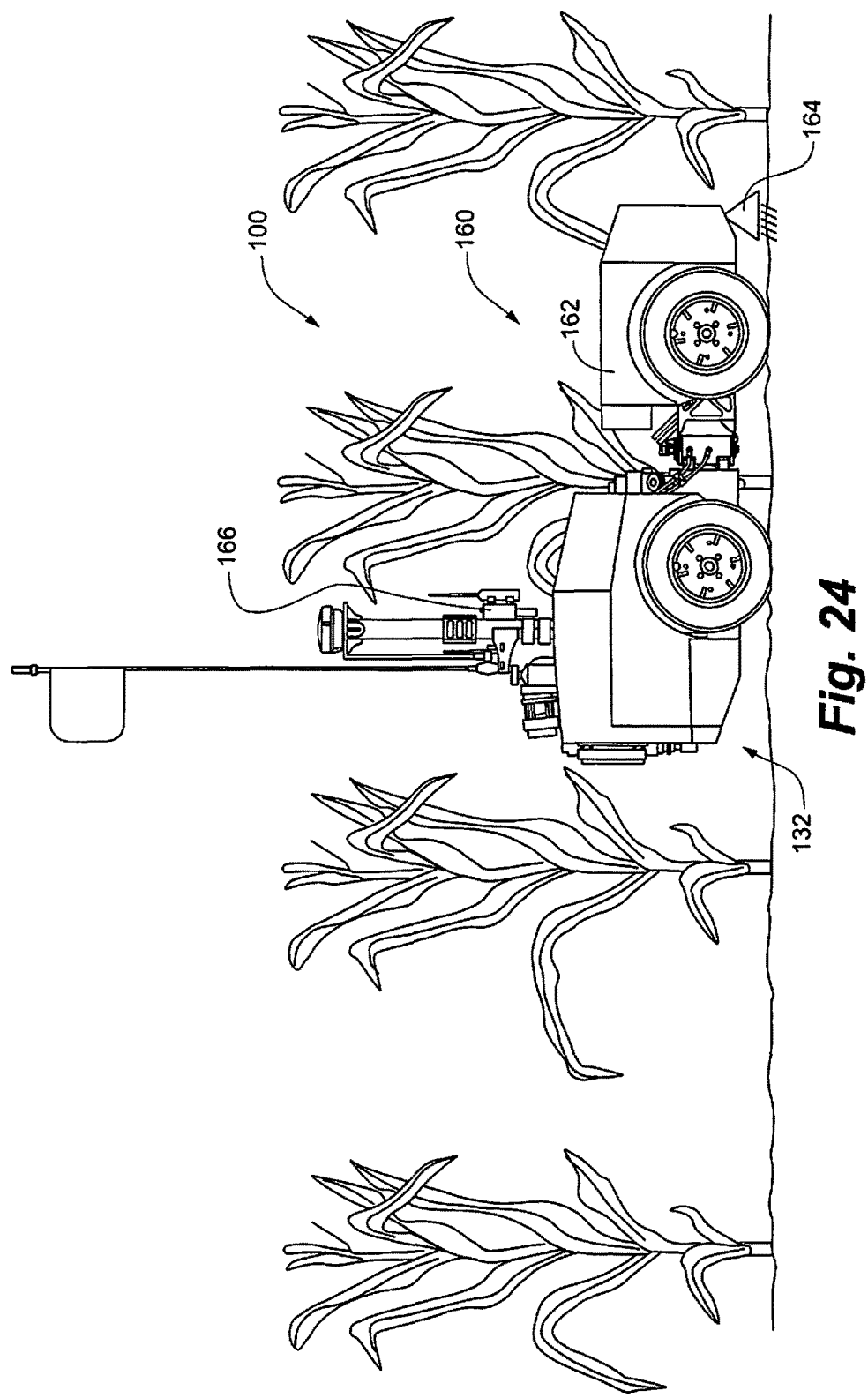
FIG. 24 is a side view of an autonomous vehicle platform system having a seeding structure in accordance with an example embodiment of the invention.

With special reference to FIG. 24, in one embodiment, autonomous vehicle platform 100 can include a seeding structure 160. Seeding structure 160 can be configured to seed a cover crop under tall planted crops 106. In one embodiment, seeding structure 160 can comprise a seed reservoir 162, a seeding attachment 164, and a seeding module 166. Seed reservoir 162 can be coupled to the vehicle base 108 and configured to contain a reservoir of seeds. In one embodiment tank 116 can comprise seed reservoir 162. The seeds can be distributed to the ground via a seeding attachment 164. Seeding module 166 can be in communication with microprocessor 122. In one embodiment, seeding can be performed while fertilizing, or in combination with other management tasks. In another embodiment, seeding can be performed independently of other in-season management tasks. With special reference to FIG. 25, in one embodiment, the seeds can be further worked into the soil using a range of common tillage methods, such as use of a harrow 188 or rake to work the seeds through any crop residue on the surface of the field. Use of a harrow 188 can be combined with, for example, a broadcast seeder, an air seeder, a seed cannon, a spinner seeder, or combination thereof.

With special reference to FIG. 26, for the purpose of providing good soil-seed contact, in some embodiments, autonomous vehicle platform 100 can be equipped with a grain drill 190. In one embodiment, grain drill 190 can include a seed hopper 192 for loading and carrying seeds, one or more disks 198 for opening the soil, one or more seeding tubes 194 for distributing seeds to the soil, and one or more closing wheels. Grain drill 188 functions by slicing one or more narrow grooves into soil 103, dropping seeds or seed balls into the groove, and then closing the groove using, for example, a rubber closing wheel. Use of a grain drill 188 enables penetration of crop residue on the surface of the soil, as well as a high precision seeding operation that maximizes use of the seeds. In some embodiments, grain drill 188 is configured to move vertically up and down to control the depth of the seeding groove. In one embodiment, grain drill 190 is attached to a third portion of the base 108.

Figure 27A:
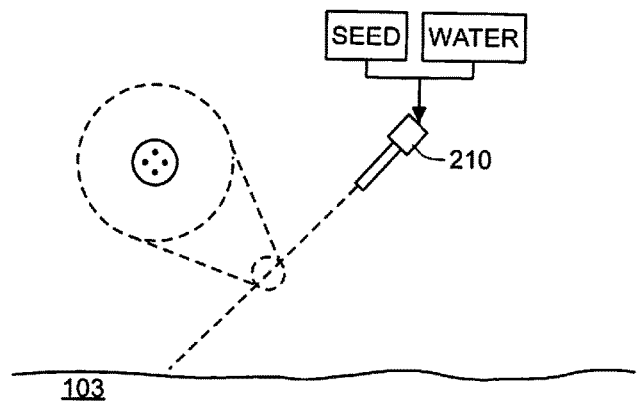
FIGS. 27A-27B are a schematic views of the mixing of seeds with other components in accordance with an example embodiment of the invention.
Figure 27B:
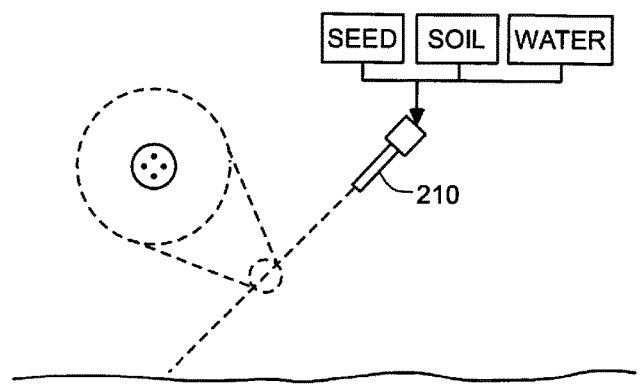
Figure 28:
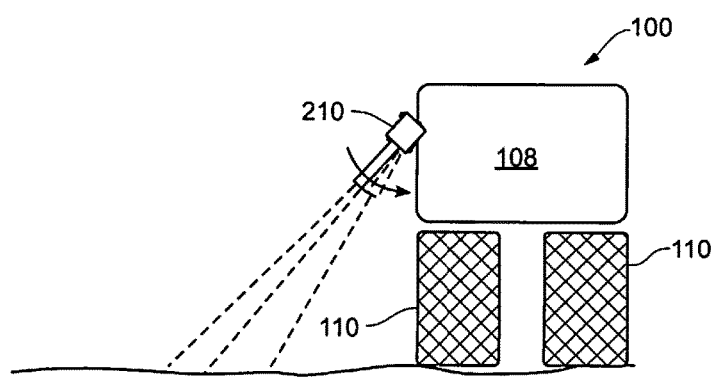
FIG. 28 is a rear view of an adjustable nozzle for spraying a liquid containing seeds in accordance with an example embodiment of the invention.
Figure 29:
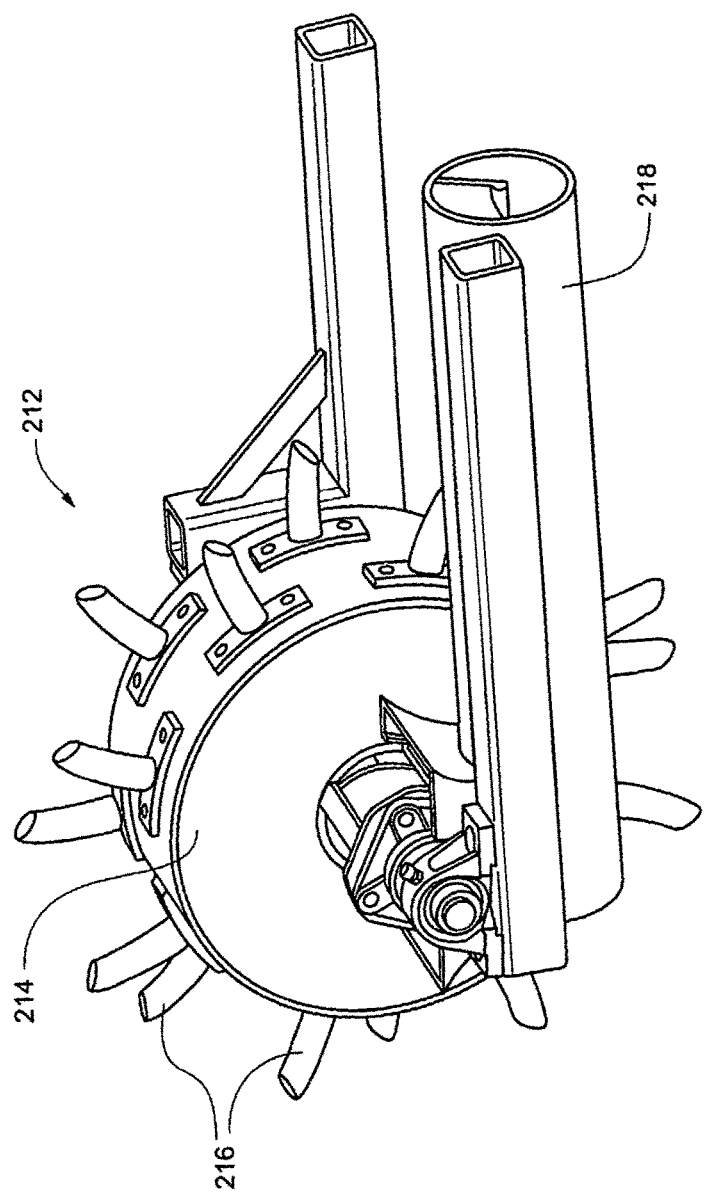

With special reference to FIGS. 27A-B and 28, in one embodiment the seeds can be mixed in a water solution or other liquid solution to promote good soil-seed contact. In this embodiment, water or liquid solution containing the seeds can be directed at the soil 103 to spray a stream or shoot a series of droplets containing seeds, thereby causing the seed solution to penetrate the surface of the soil 103. In some embodiments, the seed solution can be sprayed or shot out of a nozzle 210. The nozzle 210 can be rotated relative to autonomous vehicle platform 100 to provide a more controlled or evenly distributed seeding area.

In other embodiments, other constituents, for example soil, plant biomass or a combination thereof can be added to the seed mixture to further promote good soil-seed contact. With special reference to FIG. 29, in some embodiments, autonomous vehicle platform 100 can be equipped with a ground engaging implement 212 to scrape a quantity of soil or fallen plant biomass from the field while executing the management task to resupply the quantity of constitutes needed for the creation of seed mixture. In other embodiments, periodically all or part of one of the planted crops 106 can be harvested, chopped up, ground or shredded, and used to resupply the quantity of constitutes.

In one embodiment, ground engaging implement 212 can include a drum 214 for support and accumulating matter surrounded by a plurality of tubes 216 or spades for collecting soil or biomass. In this embodiment, drum 214 can be positioned firmly against the surface of the field with the assistance of one or more mechanical actuators, for example, a hydraulic actuator. As autonomous vehicle platform 100 moves and drum 214 rotates across the ground, the tubes 216 will contact the ground and fill with matter. Thereafter, each time a respective tube 216 contacts the ground, the plug of matter inside the tube 216 will be pushed further in towards the center of drum 214. Matter collected in the center of drum 214 can be transported to other parts of autonomous vehicle platform 100 by auger 218.

Figure 30:
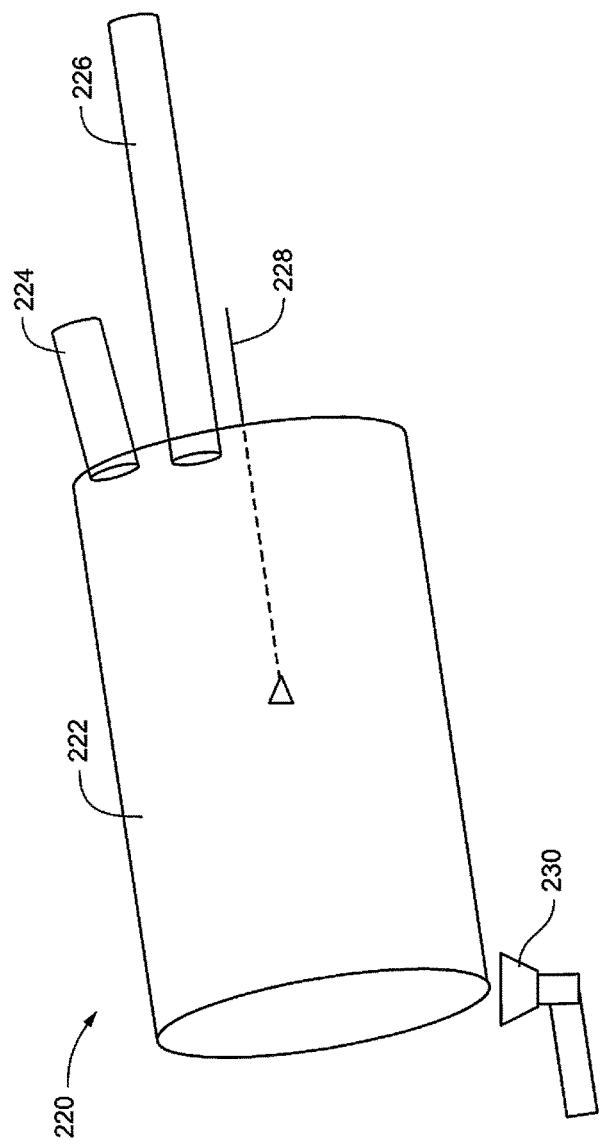

With special reference to FIG. 30, matter collected by ground engaging implement 212 can be transported to mixer 220 for the creation of a blend of the components. In one embodiment, the blended mixture can be formed into clumps or balls. Mixer 220 can include mixing drum 222, seed inlet 224, matter inlet 226, liquid inlet 228, and mixture outlet 230. In this embodiment, seeds from seed inlet 224 and soil or plant biomass from matter inlet 226 are mixed together in rotating mixing drum 222 while a liquid such as water, corn syrup, or other substance to enhance binding is added via liquid inlet 228 to form a blend of the components. As mixing drum 222 rotates the blend breaks up into smaller chunks, which after spending some period of time within rotating mixing drum 222 take the shape of a rounded mass or seed ball. The seed balls exit the mixing drum 222 via mixture outlet 230, where they can be collected or transported to a mechanism for planting. Thereafter, in one embodiment, the seeds embedded within the seed balls have sufficient moisture and nutrients to enable germination without the need to ensure the same level of soil-seed contact as required when planting seeds alone.

Figure 33:
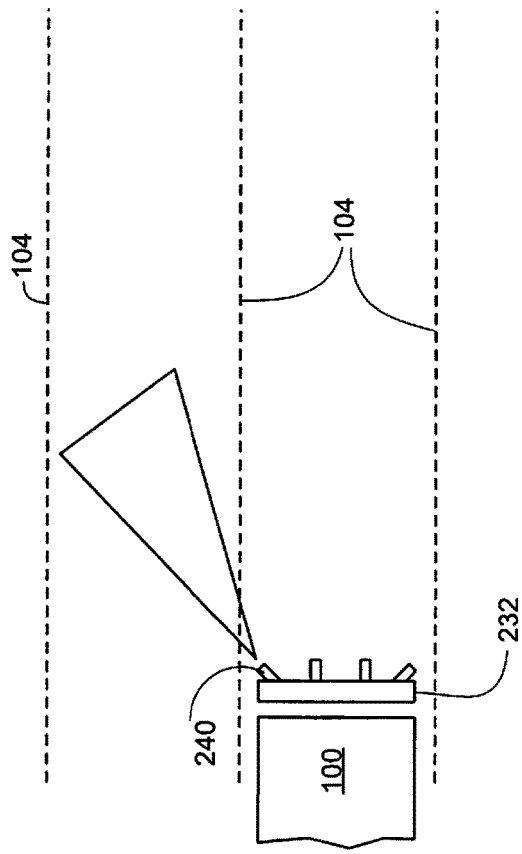
Figure 32:
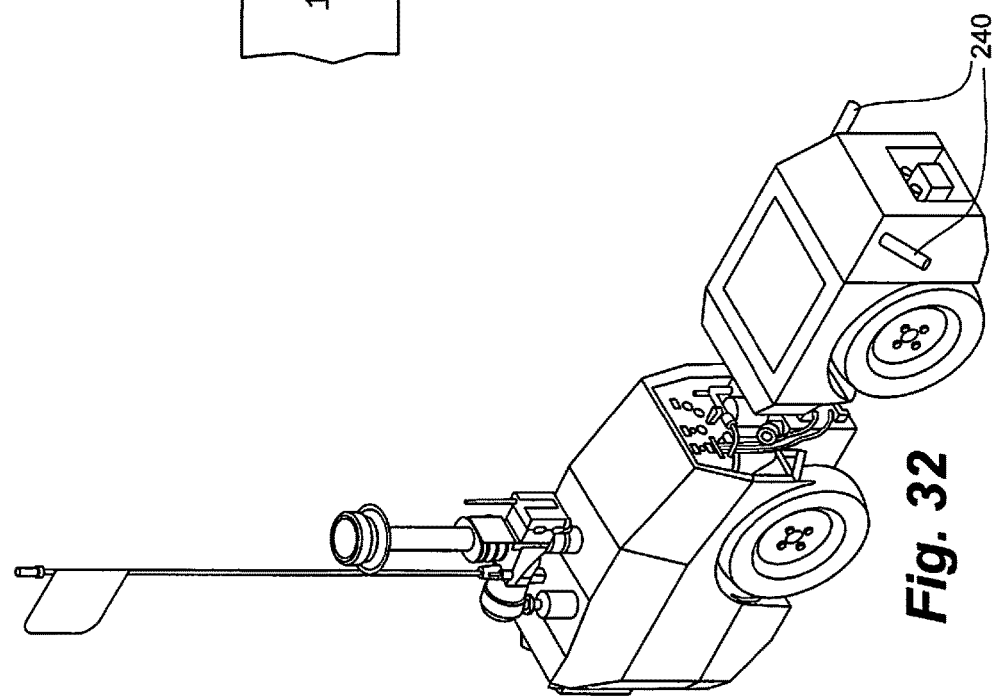

With special reference to FIGS. 31-33, in one embodiment, autonomous vehicle platform 100 can include an air seeder 232 or one or more seed cannons 240. Air seeder 232 can include a seed metering and blower mechanism 234, a seed tube 236, and a manifold 238. In this embodiment, seeds are distributed to seed metering mechanism 234 where they are blown through tube 236 at a metered rate to manifold 238. Manifold 238 can include one or more orifices configured to project the seeds or seed balls in a pattern to cover between rows (as depicted in FIG. 19) or across several rows (as depicted in FIG. 20). Seed cannons 240 work under a similar concept, but have the added advantage of enabling the seeds or seed balls to be projected at a velocity sufficient to penetrate the surface of the soil to ensure good soil-seed contact. As shown in FIG. 33, seed cannons 240 and the orifices of air seeder 232 can be directional to enable seeding in a specific direction or range of angles.

In operation, a user can deliver one or more autonomous vehicle platforms 100 to an agricultural field 102, position a refilling station 130 proximate the agricultural field 102, and orient the one or more autonomous vehicle platforms 100 to the field 102 and the refilling station 130. This can entail the user placing the one or more of the autonomous vehicle platforms 100 in manual mode and driving the one or more of the autonomous vehicle platforms 100 into a docking position at refilling station 130, however, this is just one example of how to register the refilling station 130 location within each autonomous vehicle platform's 100 navigation module 124.

After delivery, the self-direction program of autonomous vehicle platform 100 can be activated. Autonomous vehicle platform 100 can navigate to a starting point and begin navigating between rows 104 of planted crops 106 while performing an in-season management task. In some embodiments, the autonomous vehicle platform 100 can be operated by a service provider who contracts with farmers to conduct in-season management tasks. In some circumstances, particular areas of the agricultural field 102 can be omitted if prior monitoring has revealed that the crop will not benefit from added fertilizer in that area. In other circumstances, particular areas of the agricultural field 102 can be fertilized for the express purpose of monitoring the planted crop 104 response over subsequent days, such monitoring for a response could be used to guide application of fertilizer to the rest of the field.

Moving one or more autonomous vehicle platforms 100 and refilling stations 130 from field-to-field can be guided by one or more pc- or web-based software programs that a user can access via smartphone, tablet, interface on base station, or personal computer from an onsite location, or a remote location, such as the service contactor or farm headquarters. Such a program can report the progress made by the autonomous vehicle platform 100 on a particular agricultural field 102, as well as overall statistics for a given time period. Accordingly, the user can prioritize fields for treatment. Based, in part, on a user's input, the program can determine the most efficient schedule for refilling tank 116 and where the refilling stations 130 should be located. Via this program, the user is prompted at the appropriate time to begin the process of refilling or moving a refilling station 130 such that the autonomous vehicle platforms 100 can operate as continuously as possible. The logistics software can also schedule maintenance and transport between agricultural fields 102 of the autonomous vehicle platforms 100. The goal of the logistics software is to minimize the time each given autonomous vehicle platform 100 is: transiting between fields, traveling to and from the refilling station 130, waiting in queue to be refilled, or is otherwise not performing in-season management tasks.

In one embodiment, one or more autonomous vehicle platforms 100 or the system 200 can be used to deliver services to farmers, including application of fertilizer and specialized chemicals, such as pesticides. In such a configuration, operation of one or more autonomous vehicle platforms 100 could be referred to as robots as a service (RaaS). In some embodiments, a farmer or his agent may order a field prescription, or specific instruction to perform a particular treatment or set of treatments. In some embodiments the field prescription can be simple, for example an application rate uniformly across and entire field. In other embodiments the field prescription can be relatively detailed, including, for example a GIS map of the field that indicates a range of required fertilizer to be applied specific to particular locations on the GIS map. Service companies incorporate such prescriptions into their workflow for completing treatment of a particular field. In instances where field mapping structure 134 provides useful real-time information, a prescription can be updated or modified during operation.

In operation, a team of operators, for example three eight-hour shifts of two people each shift altogether comprising a team, travel from agricultural field to agricultural field, while supervising system 200. In one embodiment, system 200 could comprise twenty autonomous vehicle platforms 100 working to achieve a common task. In this embodiment, the team drops off the autonomous vehicle platforms 100 and other components at the agricultural field 102, set up the system 200, and begins execution of the requested prescription, service or in-season management task. During execution, the team monitors progress and the condition of the individual system 200 components, including responding to requests for assistance by particular autonomous vehicle platforms 100 while the service is being performed. The team can also setup one or more autonomous vehicle platforms 100 or systems in one or more other fields. Upon completion of the task, the team recovers the system 200 components.

Embodiments of the present disclosure are discussed in detail below. In describing embodiments, specific terminology is employed for the sake of clarity. However, the present disclosure is not intended to be limited to the specific terminology so selected. A person skilled in the relevant art will recognize that other equivalent parts can be employed and other methods developed without parting from the spirit and scope of the present disclosure.

What is claimed is:

1. An agricultural robot configured to perform one or more in-season management task on an agricultural field while autonomously navigating between adjacent rows of planted crops, based at least in part on an increased data collection range of one or more aerial navigation sensors, the agricultural robot comprising:
    an unmanned mobile vehicle platform dimensioned so as to enable the platform to traverse between adjacent rows of planted crops on an agricultural field;
    an extendable mast coupled to the platform and configured to selectively extend generally upward, away from a surface of the agricultural field;
    one or more aerial navigation sensors coupled to the extendable mast, such that when the mast is extended generally upward, the increased distance from the surface of the agricultural field enables an increased data collection range; and
    a navigation module in communication with the one or more aerial navigation sensors, the navigation module configured to receive the data collected by the one or more aerial navigation sensors for aid in at least one of navigating the agricultural robot between adjacent rows of planted crops and avoiding obstacles, while performing the one or more in-season management task.

2. The agricultural robot of claim 1, wherein the one or more aerial navigation sensors comprise at least one of a camera, infrared sensor, ultrasonic sensor, and LIDAR sensor.

3. The agricultural robot of claim 1, wherein the one or more aerial navigation sensors comprise two or more cameras.

4. The agricultural robot of claim 1, wherein the unmanned mobile vehicle platform is configured to navigate between adjacent rows of planted crops that have grown to a height where use of convention tractor-drawn equipment or high clearance machines presents a risk of damage to the planted crops.

5. The agricultural robot of claim 1, wherein the extendable mast is telescoping.

6. The agricultural robot of claim 5, wherein the extendable mast extends above the planted crops.

7. The agricultural robot of claim 5, wherein the extendable mast is partially extendable.

8. The agricultural robot of claim 6, wherein the extendable mast is deployed when an increased data collection range is desired.

9. The agricultural robot of claim 1, wherein the one or more in-season management task is at least one of selectively applying fertilizer, field mapping, seeding cover crops, applying a protective chemical, or soil sampling.

10. An agricultural mobile system configured to perform one or more in-season management task on an agricultural field while autonomously navigating between adjacent rows of planted crops, based at least in part on an increased data collection range of one or more aerial navigation sensors, the agricultural mobile system comprising:
 an unmanned mobile vehicle platform dimensioned so as to enable traversal between adjacent rows of planted crops on an agricultural field, the unmanned mobile vehicle platform including a navigation module configured to receive data collected by one or more external aerial navigation sensors for aid in at least one of navigating the agricultural robot between adjacent rows of planted crops and avoiding obstacles, while performing the one or more in-season management task; and
 an aerial vehicle comprising the one or more external aerial navigation sensors and configured to collect a range of data related to the navigational condition of the agricultural field.

11. The agricultural mobile system of claim 10, wherein the aerial vehicle is an autonomous drone.

12. The agricultural mobile system of claim 10, wherein the one or more aerial navigation sensors comprise at least one of a camera, infrared sensor, ultrasonic sensor, and LIDAR sensor.

13. The agricultural mobile system of claim 10, wherein processing of imagery is done on at least one of the aerial vehicle, the unmanned mobile vehicle platform, and a base station.

14. The agricultural mobile system of claim 10, wherein the aerial vehicle is deployed continuously.

15. The agricultural mobile system of claim 10, wherein the aerial vehicle is deployed as needed.

16. The agricultural mobile system of claim 10, wherein the at least one aerial vehicle is remotely controlled.

17. The agricultural mobile system of claim 10, wherein the aerial vehicle is assigned to one unmanned mobile vehicle platform, such that the aerial vehicle provides data for use with only one unmanned mobile vehicle platform.

18. The agricultural mobile system of claim 10, wherein the aerial vehicle provides data for use with multiple unmanned mobile vehicle platforms.

19. The agricultural mobile system of claim 10, wherein the unmanned mobile vehicle platform includes a docking platform enabling the aerial vehicle to land and takeoff and land from the unmanned mobile vehicle platform.

20. The agricultural mobile system of claim 19, wherein docking platform includes a recharging power source.

21. The agricultural mobile system of claim 10, wherein the aerial vehicle is connected to the unmanned mobile vehicle platform via a tether.

22. The agricultural mobile system of claim 10, wherein the unmanned mobile vehicle platform performs one or more in-season management task while the aerial vehicle is deployed.

23. The agricultural mobile system of claim 10, wherein the one or more in-season management task is at least one of selectively applying fertilizer, field mapping, seeding cover crops, applying a protective chemical, or soil sampling.

24. A method for autonomous navigation an agricultural robot, the method comprising:
 delivering an agricultural robot to an agricultural field, wherein the agricultural robot is programmed with a self-direction program;
 activating the self-direction program to autonomously navigate the agricultural robot within the agricultural field while performing one or more in-season management tasks on the agricultural field;
 detecting an obstacle within the agricultural field during autonomous navigation;
 suspending autonomous navigation in response to the detected obstacle;
 deploying one or more aerial navigation sensors to collect navigational data related to the detected obstacle; and
 transmitting the navigational data collected from the one or more aerial navigation sensors to a processing unit for further processing.

25. The method of claim 24, wherein the obstacle includes at least one of a stationary navigational obstacle, a human and an animal.

26. The method of claim 24, wherein the stationary navigational obstacle is one or more planted crops, wherein a perceived location of the planted crops fails to match an expected location of the planted crops.

27. The method of claim 24, wherein the stationary navigational obstacle is at least one of weeds and unwanted vegetation.

28. The method of claim 24, wherein the agricultural robot further includes a user interface.

29. The method of claim 28, wherein the user interface is configured to transmit navigational data collected from the one or more aerial navigation sensors to an external operator.

30. The method of claim 28, wherein the user interface is further configured to receive command data from the external operator for selectively overriding autonomous navigation.

* * * * *